(12) United States Patent
Kössl

(10) Patent No.: US 7,878,792 B2
(45) Date of Patent: Feb. 1, 2011

(54) SUPPORT ARRANGEMENT FOR AN EXTRUSION TOOL AND EXTRUSION TOOL FOR MOULDING AN OBJECT

(75) Inventor: Reinhold Kössl, Wartberg/Krems (AT)

(73) Assignee: Greiner Tool. Tec GmbH, Kremsmünster (AT)

( * ) Notice: Subject to any disclaimer, the term of this patent is extended or adjusted under 35 U.S.C. 154(b) by 190 days.

(21) Appl. No.: 11/886,189

(22) PCT Filed: Mar. 16, 2006

(86) PCT No.: PCT/AT2006/000108

§ 371 (c)(1),
(2), (4) Date: Aug. 21, 2008

(87) PCT Pub. No.: WO2006/096898

PCT Pub. Date: Sep. 21, 2006

(65) Prior Publication Data

US 2009/0026653 A1    Jan. 29, 2009

(30) Foreign Application Priority Data

Mar. 16, 2005    (AT) ................................ A 441/2005

(51) Int. Cl.
*B28B 21/98*    (2006.01)
*B29C 47/16*    (2006.01)
(52) U.S. Cl. ...................... 425/380; 425/461
(58) Field of Classification Search ............... 425/325, 425/326.1, 380, 381, 461–466, 71, 72.1
See application file for complete search history.

(56) References Cited

U.S. PATENT DOCUMENTS 3,850,568 A * 11/1974 Bartha et al. ................ 425/466
3,893,465 A * 7/1975 Cheatwood .............. 134/122 R
4,181,487 A * 1/1980 Kessler ..................... 425/326.1
4,204,821 A    5/1980 Gauchel et al.
4,470,790 A * 9/1984 Harada et al. ........... 425/192 R
4,504,210 A    3/1985 Titz et al.
5,139,402 A * 8/1992 Topf ............................ 425/71
5,236,325 A * 8/1993 Groblacher et al. ......... 425/149
5,316,459 A    5/1994 Melkonian et al.
5,424,023 A * 6/1995 Riley et al. ................. 264/560

(Continued)

FOREIGN PATENT DOCUMENTS

AT             3321          1/2000

(Continued)

OTHER PUBLICATIONS

International Search Report.

(Continued)

*Primary Examiner*—Joseph S Del Sole
*Assistant Examiner*—Ryan Ochylski
(74) *Attorney, Agent, or Firm*—Collard & Roe, P.C.

(57) ABSTRACT

A support arrangement retains several calibration dies of a calibrating device disposed one after the other in the extrusion direction on a calibrating table of an extrusion plant. The support arrangement includes a support plate and a mounting plate separate from it. A joint arrangement is disposed between the support plate and the mounting plate and enables the support plate to be spatially displaced relative to the mounting plate.

20 Claims, 24 Drawing Sheets

U.S. PATENT DOCUMENTS

| | | | |
|---|---|---|---|
| 5,480,295 A * | 1/1996 | Greve | 425/71 |
| 5,733,491 A | 3/1998 | Grosset et al. | |
| 6,116,074 A * | 9/2000 | Thoms et al. | 72/256 |
| 6,190,595 B1 * | 2/2001 | Thoms et al. | 264/177.16 |
| 6,287,102 B1 * | 9/2001 | Franz et al. | 425/71 |
| 6,296,464 B1 | 10/2001 | Pürstinger | |
| 6,840,748 B2 | 1/2005 | Gasselseder et al. | |
| 6,881,365 B2 | 4/2005 | Topp | |
| 6,952,942 B2 * | 10/2005 | Graefe et al. | 72/256 |
| 2003/0052427 A1 | 3/2003 | Kossl | |
| 2003/0155694 A1 * | 8/2003 | Rowley | 264/506 |
| 2003/0219503 A1 * | 11/2003 | Kossl | 425/71 |
| 2004/0265414 A1 * | 12/2004 | Kobayashi | 425/378.1 |
| 2005/0120771 A1 * | 6/2005 | Hofmann et al. | 73/1.01 |
| 2006/0145389 A1 | 7/2006 | Schwaiger et al. | |
| 2006/0157887 A1 | 7/2006 | Schwaiger | |
| 2006/0240134 A1 * | 10/2006 | Stieglitz | 425/325 |

FOREIGN PATENT DOCUMENTS

| | | |
|---|---|---|
| DE | 24 12 818 | 9/1975 |
| DE | 32 16 918 | 11/1983 |
| DE | 198 15 276 | 11/1998 |
| DE | 199 17 837 | 10/1999 |
| DE | 200 15 569 | 1/2001 |
| DE | 102 35 151 | 2/2003 |
| EP | 0 999 034 | 5/2000 |
| EP | 1 249 332 | 10/2002 |
| EP | 1 237 697 | 6/2004 |
| GB | 2 324 756 | 11/1998 |
| WO | WO 99/04949 | 2/1999 |
| WO | WO 2004/037516 | 5/2004 |
| WO | WO 2005/000557 | 1/2005 |

OTHER PUBLICATIONS

English Translation of International Preliminary Report on Patentability.

Austrian Search Report dated Mar. 13, 2006 with an English translation of the relevant portion.

* cited by examiner

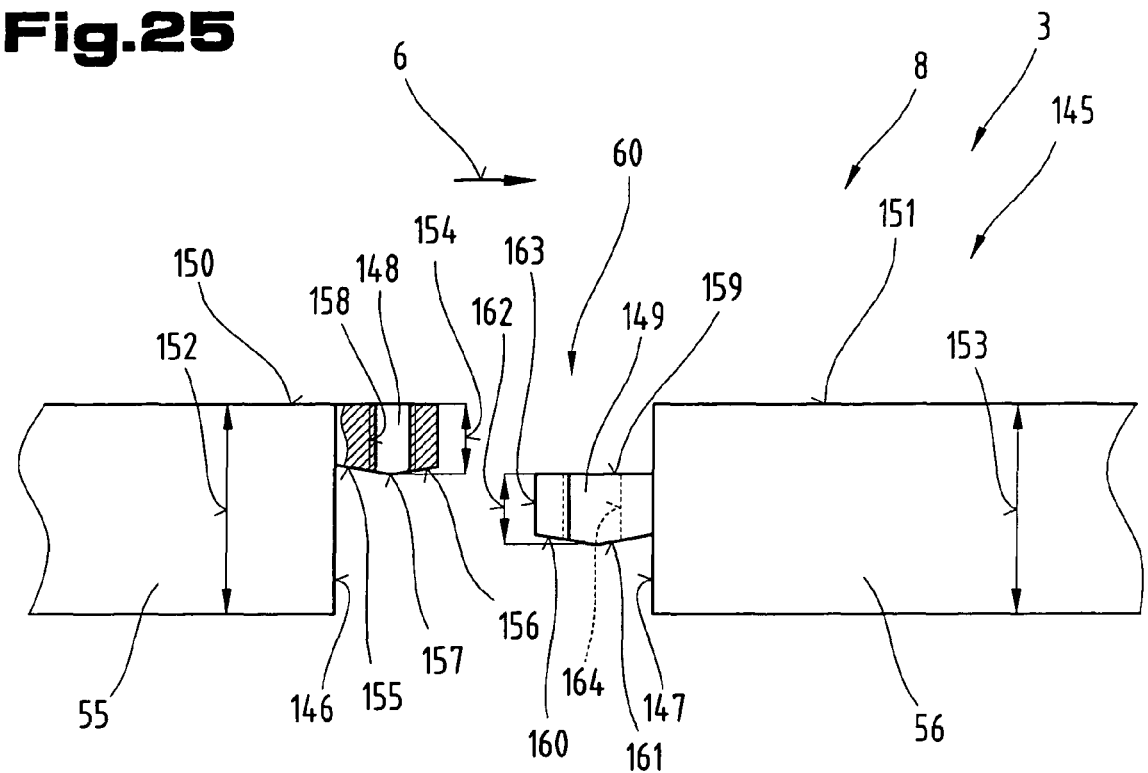
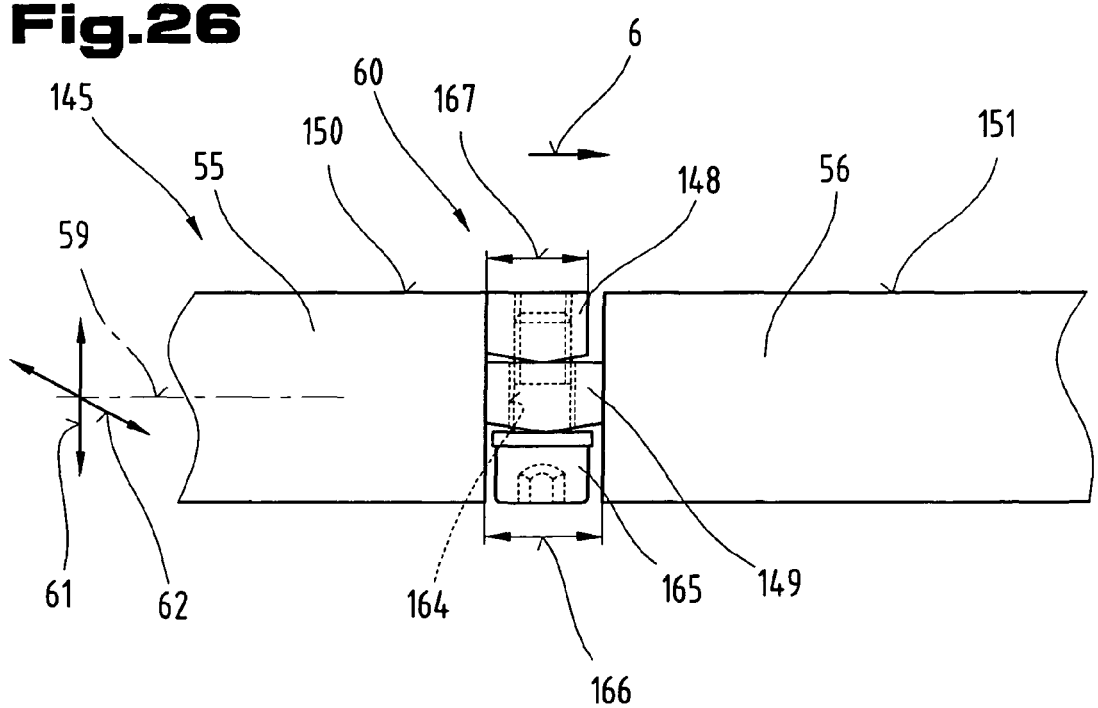

SUPPORT ARRANGEMENT FOR AN EXTRUSION TOOL AND EXTRUSION TOOL FOR MOULDING AN OBJECT

CROSS REFERENCE TO RELATED APPLICATIONS

This application is the National Stage of PCT/AT2006/000108 filed on Mar. 16, 2006, which claims priority under 35 U.S.C. §119 of Austrian Application No. A 441/2005 filed on Mar. 16, 2005. The international application under PCT article 21(2) was not published in English.

The invention relates to a support arrangement for retaining several calibration dies of a calibrating device disposed one after the other in the extrusion direction on a calibrating table of an extrusion plant. The invention further relates to a method of producing an extruded object, comprising a first part-portion with a cavity and another part-portion comprising a solid section.

Patent specification WO 2004/037516 A1 describes a method and a device for producing plastic sections, whereby at least two profiled strands are simultaneously extruded. Each of the profiled strands is then cooled and calibrated in at least one calibration die, and the largely cooled sections are conveyed by a crawler track and finally processed in a cutting unit to obtain section lengths. The calibration table has at least two die mounts which can be moved independently of one another, on which respectively separate calibration die groups are disposed. The calibration die groups each comprise several dry calibration dies disposed one after the other and downstream calibration tanks. The adjacently disposed, independent die mounts can be moved independently of one another in both the extrusion direction and in the direction extending transversely thereto. The two die mounts can also be coupled with one another in order to accommodate a single calibration die group. The adjacently disposed die mounts are based on a continuous arrangement and afford a flat support surface for the calibration die groups to be retained thereon. An angled displacement of the calibration dies of a calibration die group disposed one after the other is not disclosed.

Patent specification WO 2005/000557 describes a method and a device for producing plastic sections, whereby a first section is produced first of all by extruding a profiled strand in an extruder and then shaped in a first extrusion die nozzle connected to the extruder, after which it is calibrated and cooled in a first calibration die disposed on a calibration table. To enable different sections to be produced, the extrusion die and calibration die have to be changed. In order to keep downtimes as short as possible whilst the dies are being changed, freely displaceable manipulating devices are used to change the extrusion die nozzle and the calibration die. To permit a rapid changeover from one profiled strand to be produced to a different profiled strand, in addition to parts of the plant that are already in operation, such as the extrusion die nozzle and calibrating and cooling dies, other parts of the plant are also made ready and prepared in the region of the calibration table in anticipation of the change which has to be made. The parts of the plant which need to be changed in order to produce the different profiled strand are changed by dismantling the first plant parts and replacing them with other plant parts made ready adjacent to the calibration table. This operation is facilitated by the freely displaceable manipulating devices. An angled pivoting movement of calibration dies disposed immediately one after the other in the extrusion direction is not disclosed here either.

Patent specification EP 1 249 332 A1 describes another device for cooling and calibrating an extruded plastic section, with a cooling tank accommodating a cooling fluid and with calibration plates disposed inside the cooling tank for the plastic section exposed to the cooling fluid. A drawing-off unit is disposed downstream of the cooling tank in the direction in which the plastic section is drawn along. In order to damp vibrations and suppress longitudinal vibrations of the plastic section, at least one damping device is disposed between the inlet-end calibration plate of the cooling tank and the drawing-off unit, which lies against the plastic section in at last certain regions of the circumference. A vibration system is determined by the plastic section produced. The intention is to shift the natural vibrations of the vibration system away from this vibration system, which results in a sufficient reduction in the vibration amplitudes which cause the occurrence of marks on the plastic section. A damping unit uses a pair of calibration plates and the co-operating calibration plates are turned or pivoted towards one another about the longitudinal axis of the plastic section. As it passes through the calibration plates, the plastic section is positively clamped between them, resulting in the desired suppression of longitudinal vibrations of the plastic section without the risk of deformations occurring in the plastic section which could have a detrimental effect on the dimensional stability of the plastic section. An angular displacement of the calibration axes of calibration dies disposed one after the other is also not disclosed by this document.

Patent specification EP 0 999 034 A1 describes a device for calibrating an extruded plastic section, incorporating at least one fluid-cooled calibrator. The calibrator comprises at least two co-operating parts, preferably a top part, two side parts and a bottom part, which define a chamber in which the plastic section to be calibrated can be sucked against the side faces of the chamber by means of a vacuum. The objective is to facilitate handling and dismantling work on the calibrator by dispensing with separate mounting or bottom frames. The calibrator is of a compact block design with integrated cooling and vacuum passages, which are supplied centrally with media via a main connector. This distribution takes place from a separate supply block. The side parts of the calibrator can be easily mounted, simply by a lateral displacement or pivoting movement by means of the co-operating holders. A hinge-type bearing part may also be provided for the top part, about which the top part can be folded open. The individual calibrators are clamped on a common supply block of a flat design.

Patent specification DE 24 12 818 A1 describes a device for calibrating a tube of heat-deformable plastic as it leaves an extrusion press, and a calibration die inside a liquid bath is provided with an alternating sequence of mutually abutting calibration plates which only partially surround the plastic tube to be calibrated and an end flange terminating the liquid bath. The end flange has an orifice adapted to the cross-sectional shape of the tube to be calibrated, with a circumferential edge which lies in a sealing arrangement against the external face of the tube. The individual calibration plates disposed offset from one another in alternating sequence are designed so that one group is stationary and another group is pivotable and can be pivoted in and out between the stationary plates about a connecting screw extending parallel with the extrusion direction. The pivotable plates can thus be pivoted far enough in for the entire circumference of the tube to be calibrated to be enclosed by the calibration plates offset from one another. The pivot arrangement is axially parallel with the extrusion direction in order to obtain a mutually flush arrangement of the calibration surfaces disposed one after the other in the calibrating position.

Document DE 200 15 569 U1 describes a positioning and/or coupling device between an extrusion die and a calibration die of a calibration device disposed directly underneath it for continuously or discontinuously produced objects. The positioning and/or coupling device comprises a coupling plate disposed between the extrusion die and the calibration die and coupling elements, mounted so that they can be displaced on the coupling plate by means of a displacement drive, which can be moved into and out of engagement with coupling mounts of coupling blocks disposed on the extrusion die and/or the calibration device. By means of this coupling device, the downstream calibration die can be directly coupled with the extrusion die, thereby obtaining an exactly flush orientation of the calibration die by reference to the extrusion direction.

In the case of extrusion plants known to date, the problem of uneven cooling of hollow sections with solid profiled sections formed on them has been solved by providing an additional heating system for the more rapidly cooled solid profiled section after calibration respectively the cooling chambers to provide a finishing treatment, as described in patent specification DE 198 15 276 A1. This improves the straightness of the section to be produced, but extra equipment is needed and the energy used is very high. Furthermore, it is not always possible to obtain sufficient straightness in all applications.

In other known designs of extrusion dies, so-called mandrel retaining tools, the flow of melt delivered to a circular flow passage of the extruder from the mandrel is re-shaped in a widening annular gap flow. In this instance, the melt is only sub-divided into several part-flows in the mandrel retaining region and flows around the mandrel retaining webs disposed there, by means of which the displacement body is secured in the flow passage. In the adjoining flow passage, the part-flows are already merged again to form a common flow of melt. This is followed by a mouthpiece with parallel passage walls.

The underlying objective of the invention is to propose a support arrangement for retaining calibration dies and a method of producing extruded objects comprising a first part-portion with a cavity and another part-portion comprising a solid section, by means of which the straightness of hollow sections can be improved without the need for highly complex equipment.

This objective is achieved by the invention due to the fact that the support arrangement comprises a support plate and a mounting plate separate from it, and the support plate is disposed immediately upstream of the mounting plate as viewed in the extrusion direction, and a joint arrangement is provided between the support plate and the mounting plate by means of which the support plate can be spatially pivoted relative to the mounting plate about the joint arrangement, thereby enabling the calibration axes of calibration dies disposed one after the other in the extrusion direction to be pivoted at an angle to one another.

The ability of the support plate to move relative to the mounting plate results in a mutual spatial shift in the receiving orifices in the calibration dies disposed directly one after the other in the extrusion direction for calibrating the object. Consequently, once the profiled sections or profiled parts of the object have briefly cooled and solidified, this enables a selective pre-expansion or stretching of profiled sections or profiled parts that have not completely cooled compared with profiled sections or profiled parts which have cooled to a greater degree. The advantage of this is that, firstly, a certain degree of cooling can take place in the first or in the second calibration dies already, which means that the pre-definable expansion or stretching of the object needed to obtain the straightness takes place in the transition region to the other immediately adjacent calibration die. This also offers an easy way of moving the first calibration dies disposed on the support plate relative to the downstream calibration dies. For example, after even only a short run-in time and above all with relatively little effort, a mutual relative displacement of the calibration dies disposed one after the other can be effected by the support arrangement via the joint arrangement. Therefore, the relative displacement of the calibrating table and all of the clamping mechanisms relative to the stationary extrusion die, namely the extrusion nozzle on the extruder, can take place in one pass. This enables the displacement of the or the first calibration dies relative to the calibration die disposed directly after it and relative to the extrusion die disposed upstream of it in the extrusion direction. This results in a high saving on energy consumption because the relative position of the entire support arrangement can be adapted using only simple mechanical means.

Also of advantage is an embodiment having the support plate mounted on the mounting plate via the joint arrangement, because a reduction can be achieved in the stress caused by tensile forces which occur in the calibration die due to the section walls being sucked against the shaping surfaces of the calibration dies and the parallel drawing-off movement of the object without the need for additional equipment in the calibrating table. Not only does this offer a simple option for adjustment, it also provides a sufficiently stable mounting without the need for additional machinery.

As a result of the embodiment, wherein the support plate is respectively provided with at least one displacement device on the side remote from the joint arrangement for effecting a horizontal and vertical displacement, the support plate can be moved horizontally and vertically relative to the mounting plate using simple means, such as adjusting screws, for example. Accessibility and the user-friendliness are also significantly increased as a result.

As a result of another embodiment, wherein the mounting plate is provided with spacing and support elements by means of which the mounting plate can be supported on the calibrating table, an at least secured and fixed support for the mounting plate of the support arrangement on the calibrating table is obtained. This also improves the simplicity of the assembly.

Another embodiment, wherein the joint arrangement has a supporting batten and a support batten respectively projecting out from the end face on mutually facing end faces of the support plate and the mounting, is of advantage because co-operating components can be provided on the support plate and on the mounting plate which permit a clearly pre-definable and above all stable support of the mutually mating components in terms of their position.

The advantage of the embodiment wherein the supporting batten extends across a part-region of a thickness of the support plate is that a joint arrangement for effecting movements in all spatial directions is provided but requires little space.

As a result of another embodiment, wherein the supporting batten is directed towards a bearing surface which can be turned flat to face the calibration die, a flat transition is imparted to the support surface which can be turned towards the calibration die.

As a result of the embodiment, wherein the supporting batten has boundary surfaces extending at an angle on the side remote from the bearing surface as viewed transversely to the longitudinal extension of the support plate and parallel with the bearing surface converging in a V-shape in the direction remote from the bearing surface, the ability of the support plate to move relative to the mounting plate is fixed and the mutual contact surfaces minimized as a result.

Also of advantage is an embodiment, wherein the joint arrangement has a supporting batten and a support batten respectively projecting out from the end face on mutually facing end faces of the support plate and the mounting and wherein a first support surface is disposed in the region of the boundary surfaces converging in a V-shape, between them and parallel with the bearing surface, because notches and hence accompanying damage to the co-operating support surfaces is reduced as a result.

Another embodiment, wherein an internal thread oriented in a direction perpendicular to the bearing surface is provided in the supporting batten at an intersection point between a longitudinal axis of the support plate and the boundary surfaces converging in a V-shape, provides a possibility for connecting to the subsequent mounting plate. As a result, the support plate can be retained against the mounting plate whilst requiring a minimum amount of space.

As a result of one embodiment, wherein the support batten has a flat, other support surface on the side facing the bearing surface, any mutual tilting of the support plate relative to the stationary mounting plate is prevented without obstructing the possible spatial movements.

In this respect, an embodiment wherein the other support surface of the support batten is disposed offset from the bearing surface in the direction perpendicular thereto has proved to be of advantage because sufficient space is provided for accommodating the supporting batten between the support plate and mounting plate disposed immediately one after the other.

As a result of another advantageous embodiment, wherein the offset of the other support surface of the support batten from the bearing surface corresponds to a thickness of the supporting batten in the direction perpendicular to the bearing surface, when the bearing surface are oriented in parallel, a mutual, flat orientation of the bearing surface for accommodating the calibration dies is obtained. As a result, a support level is obtained which makes it easy to prepare the calibration dies so that the mutual spatial displacement of the calibration dies disposed one after the other can take place via the support plate starting from this central support level.

As a result of the embodiment, wherein the support batten has other boundary surfaces inclined at an angle converging in a V-shape in the direction remote from the bearing surface on the side remote from the bearing surface as viewed transversely to the longitudinal extension of the mounting plate and parallel with the bearing surface, the connecting element can be pivoted together with the support plate relative to the mounting plate. Co-operating with the connecting element is a simply operated joint arrangement, which permits a three-dimensional relative displacement in spite of a high degree of mutual positioning stability.

Also of advantage is another embodiment wherein the thickness of the supporting batten and that of the support batten are in total less than the thickness of the support and the mounting plate because a low height of the joint arrangement can be obtained whilst nevertheless affording sufficient stability.

With a support arrangement wherein the end face of the support plate is supported on an end face of the support batten facing it, a simple support option is obtained for the tensile forces occurring in the extrusion direction and transmitted by the object as it is fed through the calibration dies. As a result of this support, there is no need for additional means for retaining or fixing the support plate relative to the calibrating table. Moreover, the displacement mechanism of the support plate can be very easily retained.

Also of advantage is an embodiment wherein the end face of the support batten facing the support plate converges in a V-shape at least in the region of the longitudinal axis in the direction towards the support plate as viewed in the direction perpendicular to the bearing surface, because in spite of the mutual support, it is still possible to move the support plate sufficiently relative to the mounting plate.

The advantage of the embodiment wherein an orifice oriented in the direction perpendicular to the bearing surface, in particular a bore, is disposed in the support batten at an intersection point between the longitudinal axis of the mounting plate and the other boundary surfaces converging in a V-shape, is that a joint arrangement operating in the smallest space is obtained, which enables a three-dimensional displacement in spite of having the simplest of constructions.

Another option is an embodiment wherein the orifice has a connecting element extending through it, in particular a screw, which mates in the internal thread of the supporting batten, which uses the simplest of means to provide a joint arrangement which enables sufficient possibility of movement and a high degree of operating safety and does so whilst requiring the smallest of spaces.

In this respect, an embodiment wherein a width of the support batten in the region of the longitudinal axis and in the direction thereof is bigger than a width of the supporting batten in the same region and in the same direction has proved to be of advantage because an effective contact of the support plate on the support batten of the mounting plate can be obtained but the support plate can still be spatially pivoted within a pre-definable angular range relative to the mounting plate.

Irrespective of the above, however, the objective of the invention can be achieved by a method of producing an extruded object, and the support arrangement comprises a support plate and a mounting plate separate from it, and the support plate is disposed immediately upstream of the mounting plate in the extrusion direction, and the calibration axes of calibration dies disposed one after the other in the extrusion direction are pivoted in different directions relative to one another about a joint arrangement disposed between the support plate and the mounting plate, and the first part-portion incorporating the cavity is stretched relative to the other part-portion comprising the solid section in the transfer region between the support plate and the mounting plate.

The ability of the support plate to move relative to the mounting plate results in a mutual spatial shift in the receiving orifices in the calibration dies for calibrating the object disposed directly one after the other in the extrusion direction. Consequently, once the profiled sections or profiled parts of the object have briefly cooled and solidified, this enables a selective pre-expansion or stretching of profiled sections or profiled parts that have not completely cooled compared with profiled sections or profiled parts which have cooled to a greater degree. For example, after even only a short run-in time and above all with relatively little effort, a mutual relative displacement of the calibration dies disposed one after the other can be effected by the support arrangement via the joint arrangement. Therefore, the relative displacement of the calibrating table and all of the clamping mechanisms relative to the stationary extrusion die, namely the extrusion nozzle on the extruder, can take place in one pass. This enables the displacement of the or the first calibration dies relative to the calibration die disposed directly after it and relative to the extrusion die disposed upstream of it in the extrusion direction. This results in a high saving on energy consumption because the relative position of the entire support arrangement can be adapted using only simple mechanical means.

The invention will be explained in more detail below with reference to examples of embodiments illustrated in the appended drawings.

Of these:

FIG. 25 is a diagram on a larger scale showing a view in partial section of a part region of the support arrangement illustrated in FIGS. 22 to 24 in the region of the joint arrangement in a position spaced apart from the joint arrangement;

FIG. 26 is a diagram on a larger scale showing a view of the joint arrangement of the support arrangement illustrated in FIG. 25 in the assembled state;

Figure 1:
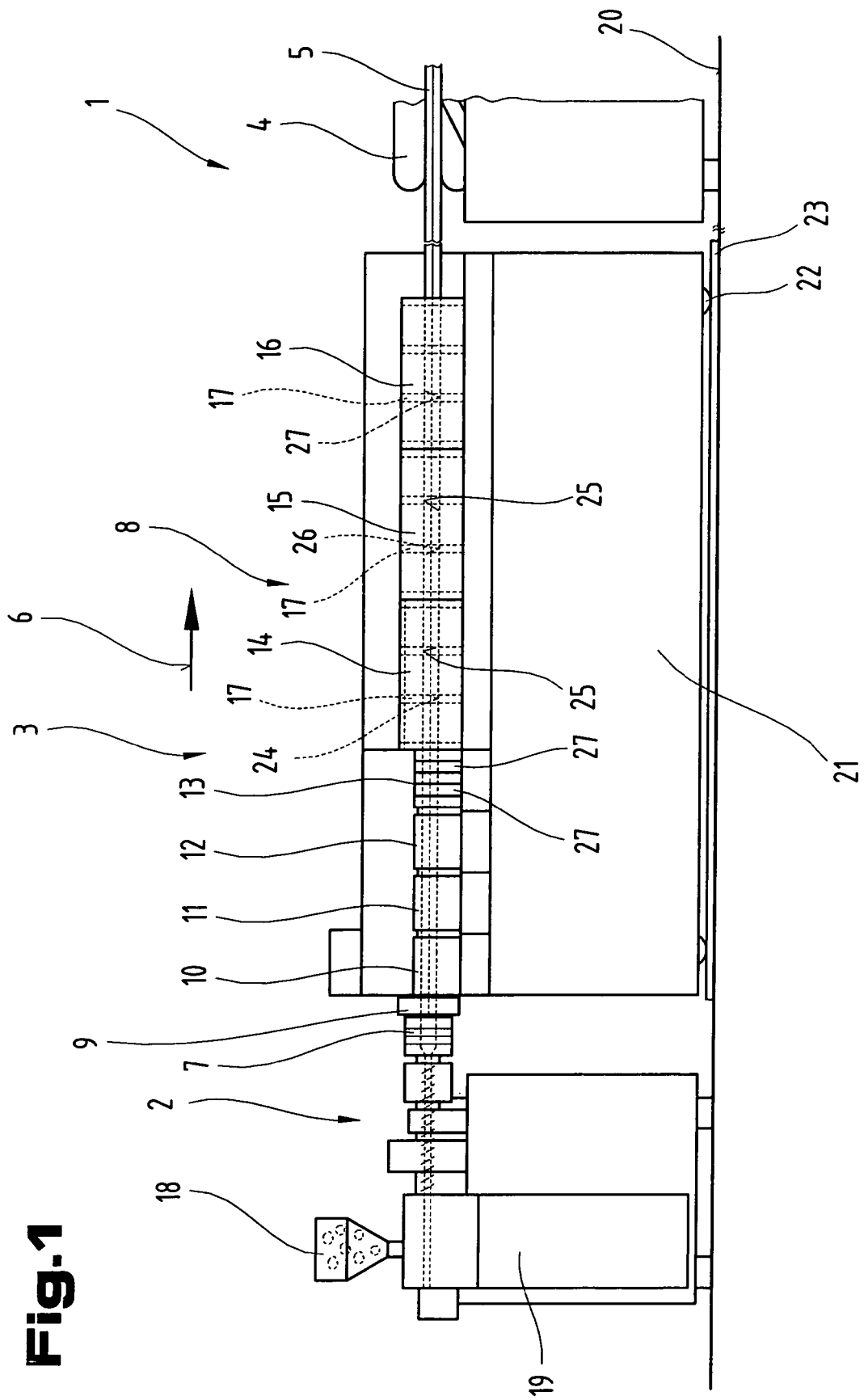
FIG. 1 is a highly simplified, schematic diagram showing a side view of an extrusion plant with a shaping system proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates an extrusion plant 1, comprising an extruder 2, a shaping system 3 disposed downstream of it and a crawler track 4 for an extruded article 5 disposed downstream of it. The purpose of the crawler track 4 is to draw the article 5, for example a section, in particular a hollow section of plastic such as used for building windows and/or doors, in the extrusion direction 6 from the extruder 2 through the entire shaping system 3. In this embodiment, the shaping system 3 consists of at least one extrusion tool 7 assigned to the extruder 2 and retained thereon, e.g. an extrusion die, a calibrating device 8 with at least one but preferably several calibrating dies 9 to 13, and at least one but preferably several cooling chambers 14 to 16, in which several calibration plates 17 are disposed. However, individual ones of the calibration plates 17 may be provided solely as support plates to provide a supporting function for the object 5.

Disposed in the region of the extruder 2 is a container 18 from which a material, such as a mixture or a granulate for forming a plastic, is supplied, which is fed by means of at least one conveyor screw in the extruder 2 to the extrusion die 7. The extruder 2 also has a plasticizing unit, by means of which the material is heated, plasticized and conveyed in the direction of the extrusion tool 7 as it is fed through under pressure by means of the conveyor screw, with heat being applied to the material by additional heating systems if necessary depending on its intrinsic properties. Before the inlet to the extrusion die 7, the mass flow of plasticized material is formed to the desired cross-sectional shape as it is fed into transition zones, but what is usually a bar-shaped melt strand of plasticized plastic in the form of a plastic mass is fed out of the extruder 2 and on to the extrusion die 7. This strand of melt preferably has a circular cross-section and is shaped to the desired profiled geometry of the object 5 to be produced inside the extrusion die 7, as will be explained in detail below.

The extrusion die 7, the plasticizing unit and the container 18 are supported and retained on a machine bed 19, the machine bed 19 being placed on a level standing surface 20, for example a flat hangar floor.

In the embodiment described as an example here, the entire calibrating device 8 is arranged and retained on a calibrating table 21, the calibrating table 21 being supported by means of rollers 22 on tracks 23 secured to the standing surface 20. The purpose of mounting the calibrating table 21 in this way is to enable the entire calibrating table 21 to be moved on the tracks 23 by means of the rollers 22 together with the devices and apparatus mounted thereon backwards and forwards from the extrusion die 7 in the extrusion direction 6—indicated by the arrow. To make such displacement easier and more accurate, the calibrating table 21 is provided with a drive system, not illustrated in detail, permitting a selective and controlled longitudinal movement of the calibrating table 21 to the extruder 2 and away from the extruder 2. Any solutions and units known from the prior art may be used for driving and controlling this drive system.

The calibration dies 9 to 13 of the calibrating device 8 are supported on a mounting plate and designed to operate in a vacuum calibration system, whereby the extruded object 5 is calibrated within the individual shaping and calibration dies 9 to 13. The layout of the vacuum slots, cooling portions and flow passages or cooling bores as well as their connections and supply are based on systems known from the prior art. One or more of the calibration dies 9 to 13 may be formed by individual immediately adjacent calibration plates disposed one after the other, as described in more detail in AT 003 321 U1.

This calibration process may be a combination of dry and wet calibration, for example, or only a fully dry calibration. The system may also be set up so as to totally prevent any ambient air from getting between at least the extrusion die 7 and the first calibration die 9 and/or at least between the first calibration die 9 and the other calibration dies 10 to 13. Naturally, however, it would also be possible to allow air to pass onto the object 5 in at least certain regions between the individual calibration dies 9 to 13 and to provide water baths.

The cooling chamber 14 to 16 is illustrated in a simplified manner as a housing and the interior is sub-divided into regions disposed one immediately after the other by calibration plates 17. In order to disperse heat from the object 5 rapidly, the interior of the cooling chambers 14 to 16 is at least partially filled with a cooling medium, which cooling medium may be both liquid or gaseous. Naturally, the same cooling medium may be supplied in different aggregate states in the cooling chambers 14 to 16. In addition, it is also possible to place the interior of the cooling chambers 14 to 16 at a pressure that is lower than atmospheric air pressure, in which case this could be said to be a vacuum tank.

On leaving the extrusion die 7, the object 5 has assumed a pre-defined cross-sectional shape formed by the latter, which will be sufficiently calibrated and/or cooled in the adjoining calibration dies 9 to 13 until the surfaces or the peripheral or external region of the tough-plastic object 5 has been cooled to the degree that its external shape is stable and it has assumed the corresponding dimensions. At the calibration dies 9 to 13, the object 5 then passes through the cooling chambers 14 to 16 in order to disperse more heat so that it can be further cooled and optionally calibrated as well as supported, so that any residual heat still contained in the object 5 is fed away.

In order to operate the extrusion plant 1, in particular the units and devices disposed and retained on the calibrating table 21, it can be connected to a supply system by means of which a whole range of units can be supplied with a liquid cooling medium, electrical energy, compressed air and a vacuum, for example. Various types of power systems may be used, depending on requirements.

In order to feed the object 5 through the individual calibration plates 17, the latter have at least one calibration orifice 24 or aperture, and the individual shaping surfaces 25, 26 of the calibration orifice 24 bound and surround certain regions of an external profiled cross-section 27 of the object 5 fed through. As described above, the object 5 is cooled in the region of its external walls and its exterior as it passes through the individual calibration dies 9 to 13 and thus the softened plastic material sufficiently solidified that the external profiled sections of the hollow section already have a certain intrinsic stiffness and strength. To enable any residual heat still present in the section interior, in particular in the region of the cavities and the webs disposed therein, to be totally fed away from the object 5, the vacuum tanks 14 to 16 housing the calibration plates 17 are provided in this embodiment.

During this further cooling and solidification process, internal tensions build up in the region of the profiled cross section due to the differing heat dispersion around the cross-section, as a result of which the object 5 must be guided at pre-definable points of its cross-section so that the requisite cohesiveness can be obtained to a sufficient degree of accuracy, especially in the region of joins, sealing grooves, etc. As a result, a high pressure and hence associated friction forces occur at the guiding and contact points, starting from the object 5 and spreading towards the calibration plates 17, thereby causing increased abrasion at these pre-definable points and consequently an ever increasing softening of the compound. Due to this delayed cooling around the cross-section and the associated solidification of the plastic mass, the entire profiled geometry shifts, making it necessary to undertake finishing work on the individual shaping surfaces 25 or 26 of the calibration orifice 24 to ensure the required dimensional conformity of the object 5 to be produced.

At the calibration die 13 disposed directly upstream of the first cooling chamber 14, it may be seen that the latter comprises several calibration plates 27 disposed immediately one after the other and lying in contact with one another in at least certain regions, the calibration plates 27 being oriented with their thickness in the direction of the extrusion direction 6.

Figure 2:
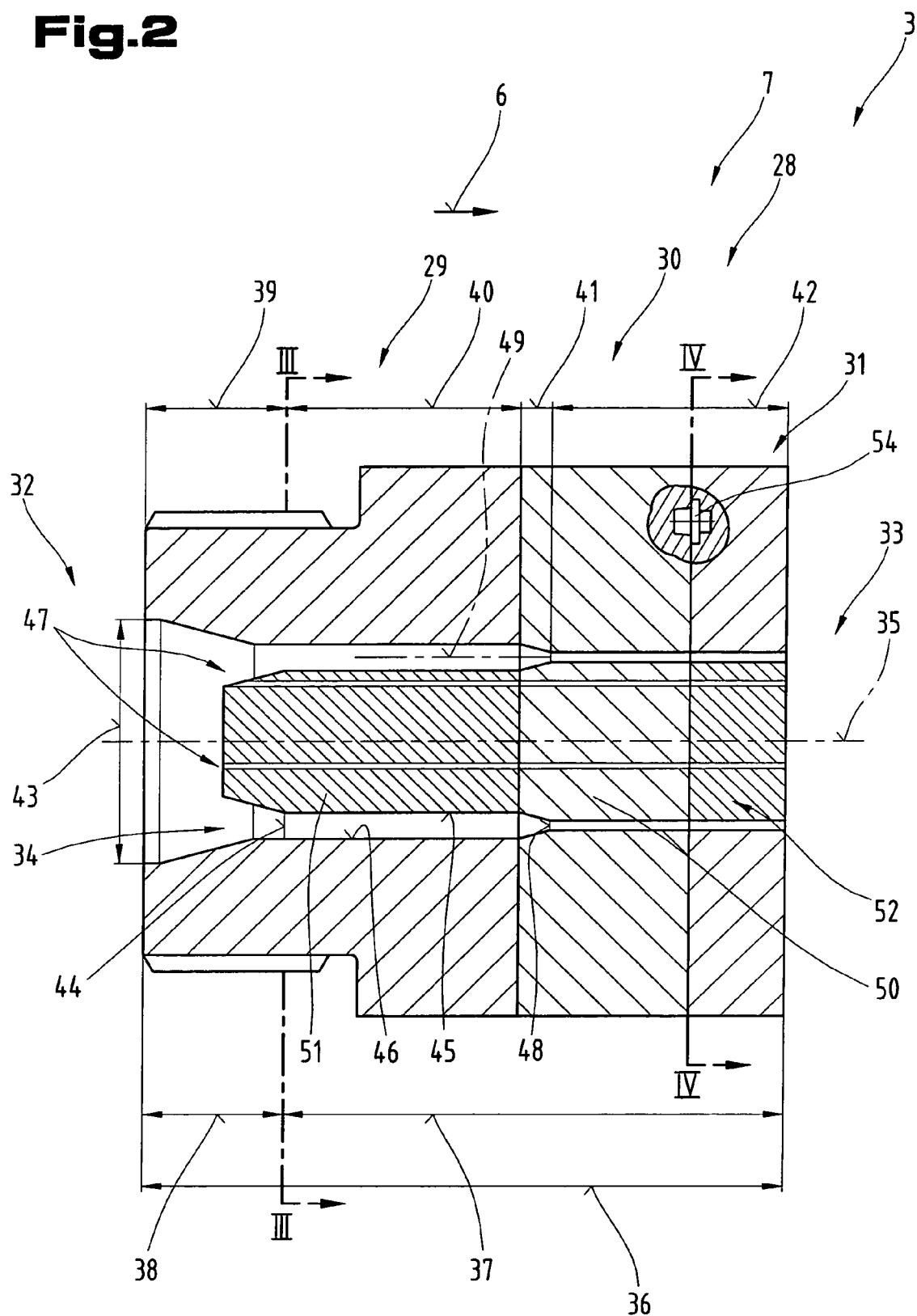
FIG. 2 is a simplified, schematic diagram showing a side view in section of one possible embodiment of an extrusion die of the shaping system.
Figure 3:
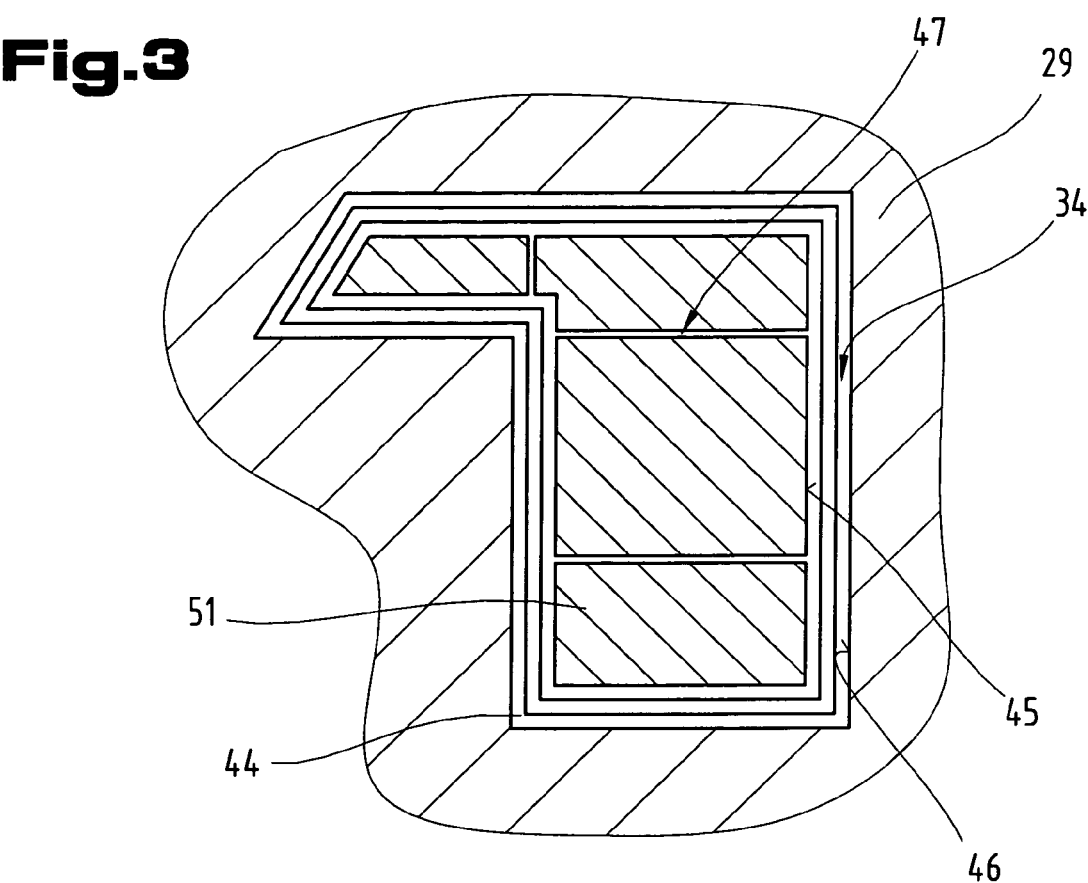
FIG. 3 is a view in section showing a part region of the extrusion die illustrated in FIG. 2 along line III-III indicated in FIG. 2.
Figure 4:
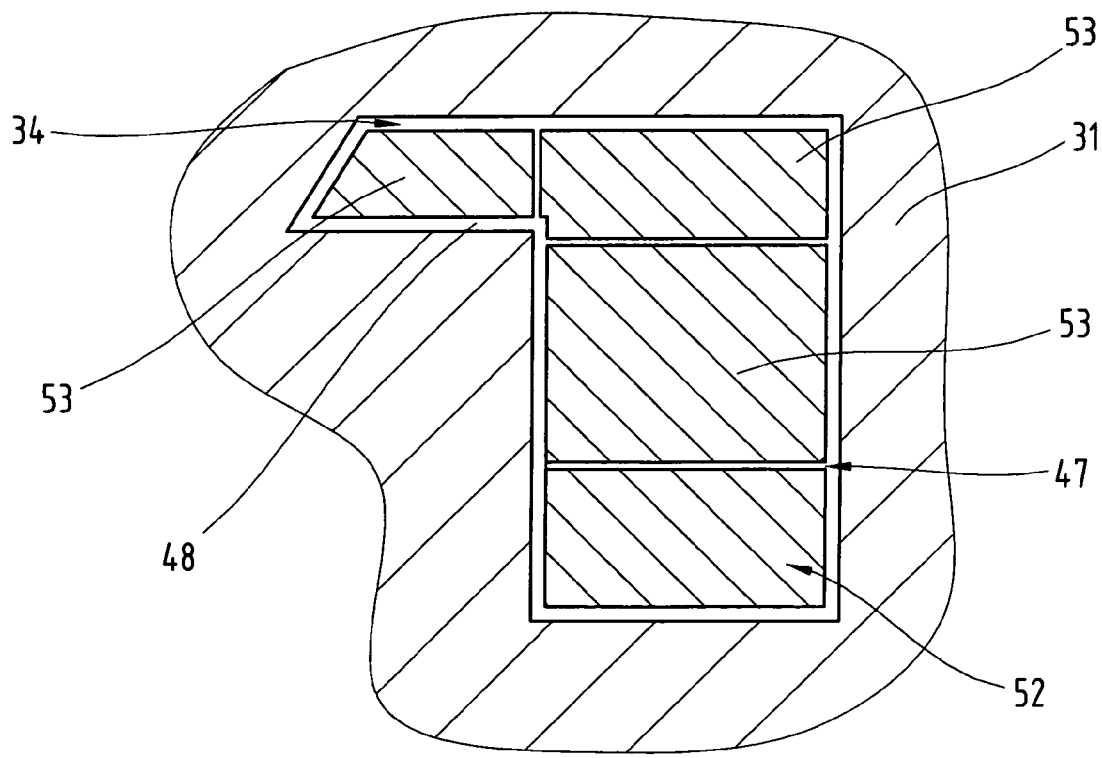
FIG. 4 is a view in section showing another part region of the extrusion die illustrated in FIG. 2 along line IV-IV indicated in FIG. 2.

In FIGS. 2 to 4 provided a simplified and schematic illustration of the extrusion die 7 of the shaping system 3, which extrusion die 7 can also be said to be a so-called extrusion nozzle 28. The extrusion die 7 in this instance has several elements 29 to 31 disposed immediately one after the other in the extrusion direction 6, which bound at least one passage 34 for the plastic mass, in particular the melt of plasticized plastic, in the extrusion direction 6 between an inlet region 32 and an outlet region 33.

Extending between the inlet region 32 and the outlet region 33 is a longitudinal axis 35, oriented parallel with the extrusion direction 6. The individual, elements 29 to 31 disposed one after the other to form the extrusion die 7 have a total length 36 in the extrusion direction 6. The passage 34 illustrated in this instance extends, as explained above, between the inlet region 32 and the outlet region 33 and a predominant longitudinal portion 37 between the inlet region 32 and the outlet region 33 is likewise oriented parallel with the extrusion direction. This longitudinal portion 37 oriented in parallel extends from the outlet region 33 as far as the inlet region 32 and terminates at a short distance 38 upstream of it.

Accordingly, the entire passage 34 between the inlet region 32 and the outlet region 33 is sub-divided along its longitudinal course into several passage portions 39 to 42 which have differing cross-sections, as indicated on a simplified basis by lines. The first passage portion 39 constitutes a transition from a solid passage cross-section 43 to a different jacket-shaped passage cross-section 44, and the second passage portion 40 starts in the region of the passage cross-section 44. This jacket-shaped passage cross-section 44 is also illustrated on a simplified basis in FIG. 3.

In this respect, it should be pointed out that the cross-sectional shape illustrated here is but one of many possible profiled cross-sections. In the portion of its external-jacking-shaped design, the passage 44 inside the extrusion die 7 is bounded in its longitudinal extension between the inlet region 32 and outlet region 33 by inner and outer passage walls 45, 46 extending parallel with one another. The passage cross-section in the outlet region 33 corresponds to a profiled geometry of the object 5 to be produced. As may also be seen from the diagram of FIG. 2, the passage 34 has a passage cross-section which decreases along its longitudinal course or its longitudinal extension in the extrusion direction 6.

As described above, the extrusion die 7 is directly connected to the extruder 2, the latter having an outlet orifice which has a complete, preferably circular cross-section. Through this orifice, the extrudate prepared in the extruder is fed onwards and transferred to the extrusion die 7, where it is re-shaped from the solid melt strand to the profiled geometry of the object 5 to be produced. For the sake of simplicity and to retain better clarity in the drawings, the strand of melt is not shown inside the extrusion die 7 in FIGS. 2 to 4.

The second passage portion 40 adjoining the first passage portion 39 is likewise disposed in the first element 29 of the extrusion die 7 and has the jacket-shaped passage cross-section 44. Its longitudinal extension is oriented parallel with the extrusion direction 6. The size of the passage cross-section 44 in the second passage portion 40 remains constant across its longitudinal course or longitudinal extension.

As may also be seen from a comparison of FIGS. 2 to 4, at least one additional passage 47 is provided in the second passage portion 40 inside the jacket-shaped passage cross-section 44 of the first passage 34, and the additional other passage 47 extends as far as the outlet region 33 and is used to form webs disposed inside the jacket of the object 5. This being the case, the additional other passage 47 opens into the jacket-shaped passage cross-section 44 of the first passage 34, preferably at the two end regions disposed transversely to the extrusion direction, so that the webs are joined to the jacket in a manner known per se.

At the end of what is the first elements 29 of the extrusion die 7 in this instance is the transition of the passages 34, 47 into what is the second element 30 of the extrusion die 7 in this instance.

The third passage portion 41 adjoining the second passage portion 40 is disposed at the end of the second element in the transition region to the third element 30 disposed in it and has the passage cross-section 48 which decreases from the passage cross-section 44 in the extrusion direction 6. The decrease in the passage cross-section 44 to the small passage cross-section 48 is preferably constant as well as symmetrical by reference to the extrusion direction 6.

As illustrated in this transition region between the two passage portions 40, 41 in FIG. 2, the passage cross-section 44 decreases to the small passage cross-section 48 in the third passage portion 41 centrally to a passage center 49. With its reduced passage cross-section 48 at the end of the third passage portion 41 and at the start of the fourth passage portion 42, the passage 34 has already assumed the profiled geometry of the object 5 to be produced. The fourth passage portion 42 adjoining the third passage portion 41 likewise extends parallel with the extrusion direction 6, and in this fourth passage portion 42, the size of the jacket-shaped passage cross-section 48 remains constant across its longitudinal course and already corresponds to the profiled geometry of the object 5 to be produced. The same applies to the other passages 47 disposed inside the passage cross-sections 44, 48 for forming the webs, as indicated in the transition region between the first element 29 and second element 30.

The extrusion die 7 is illustrated on a simplified basis comprising the three elements 29 to 31 disposed one after the other and they bound the passage 34 at least at its external circumference. In the embodiment illustrated as an example, the first passage portion 39 and the second passage portion 40 are disposed in the first element 29. The third and part of the fourth passage portion 41, 42 are disposed in the second element 30. Finally, the rest of the fourth passage portion 42 is disposed in the third element 31, the advantage of which is that corrections which have to be made to the profiled geometry are made in only the relatively thin third element 31. This special arrangement of the individual passage portions 39 to 42 in the elements 29 to 31 disposed one after the other and one against the other makes processing of the passages simple, as a result of which an extrusion die 7 for hollow sections with internal webs can be set up in a significantly shorter time.

The individual elements 29 to 31 are preferably made from a round material and, depending on the size of the profiled geometry to be produced, an external diameter of 180 mm may be used. This external diameter depends on the heating elements for heating the extrusion die 7, although these are not illustrated, and may be freely selected in a manner known from the prior art. The total length 36 of the individual elements 29 to 31 may be 205 mm for example, and the first element 29 may have a thickness of 120 mm in the extrusion direction 6, the second element 30 may have a thickness of 55 mm and the third element 31, finally, may have a thickness of 30 mm.

As briefly described above, the passage 34 has the two inner and outer passage walls 45, 46 bounding it, and the inner passage walls 45 which internally bound the jacket-shaped passage cross-sections 44, 48 disposed on at least one mandrel 50. In the embodiment illustrated as an example here, this mandrel 50 is a stationary mandrel disposed in the second element 30, which is connected to the second element 30 by means of several webs or ribs extending parallel with the extrusion direction 6, although these are not illustrated. These ribs or webs separate the strand of melt as it passes through the passage 34 and it is then merged again in the third element 31 of the extrusion die 7 to form a continuous cross-section extending around the circumference. Designed in this manner, the element 30 may also be described as a mandrel retaining plate, as standard in extrusion technology.

Provided in at least certain regions to delimit the passage cross-section 44 in the first element 29 and disposed inside it in the jacket-shaped passage cross-section 44 in the extrusion direction 6 is a mandrel part 51, which may also be described as a tip projecting from the end of the second passage portion 40 in the direction opposite the extrusion direction 6 in the direction towards the inlet region 32. As viewed in the direction opposite the extrusion direction 6, the mandrel part 51 converges at the end directed towards the inlet region 32. This makes it easier to direct the whole strand of melt to the jacket-shaped passage cross-section 44. This mandrel part 51 may be supported on the mandrel 50 of the second element 30 and connected to it. This makes it possible to position it exactly and retain it in order to limit the passage 34 without any difficulty.

As may also be seen by comparing FIGS. 2 and 4, the passages 34 and 47 are bounded by a mandrel fitting 52 in the region of the third element 31, which projects out from the mandrel 50 of the second element 30 in the extrusion direction 6 and into the third element 31. This mandrel fitting 52 may be made up of several mandrel fitting parts 53, and this will depend on the number of webs insides the profiled jacket.

It is also possible to provide several fitting elements 54 between the individual elements 29 to 31, such as illustrated in the top right-hand corner of FIG. 2 between the second element 30 and third element 31. The purpose of these fitting elements 54 is to orient and position the individual elements 29 to 31 exactly with respect to one another and the way they are retained on one another after this positioning in order to form the extrusion die 7, for example by screw connections.

Figure 5:
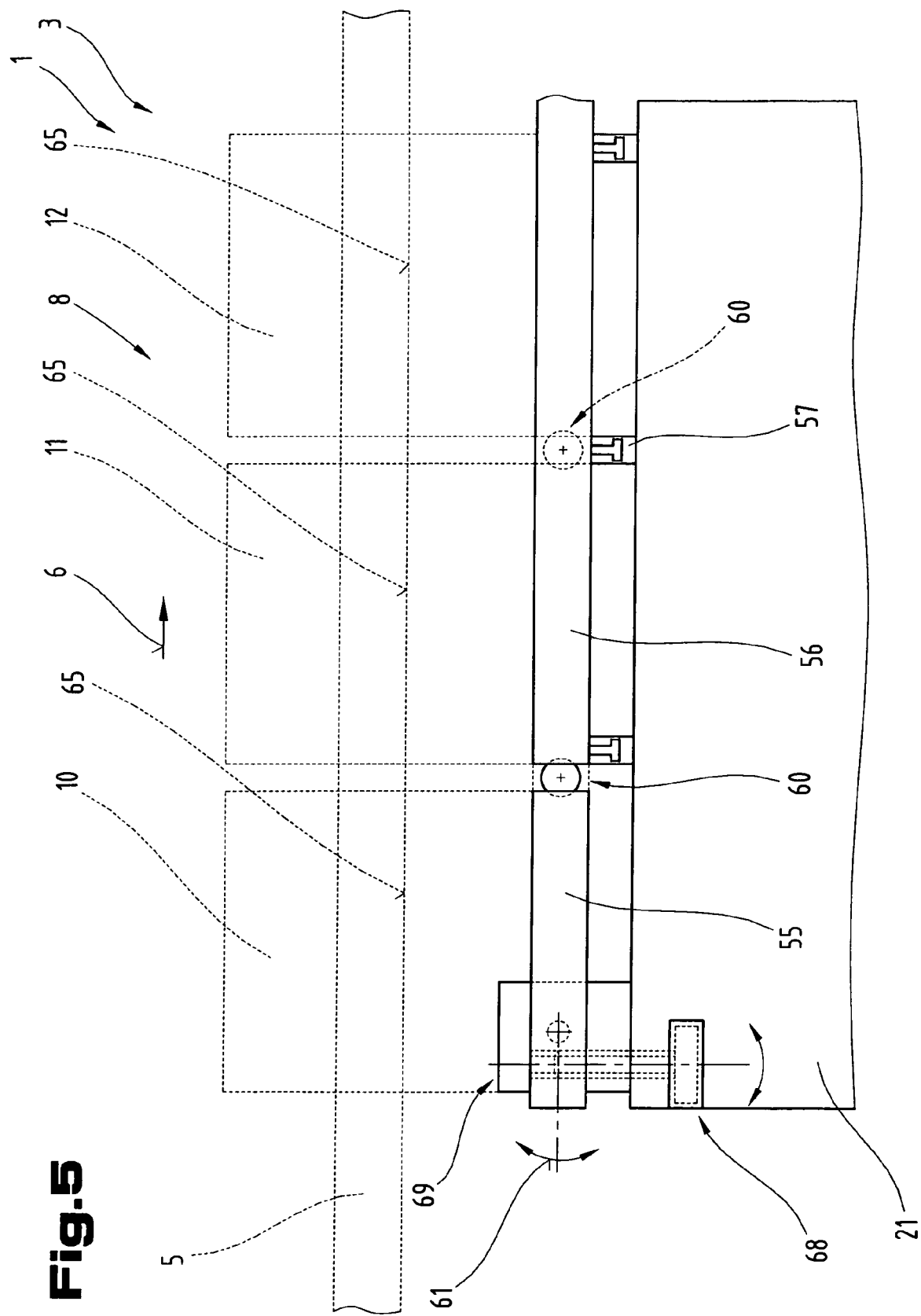
FIG. 5 is a simplified, schematic diagram showing a side view of another embodiment of the shaping system in the region of the calibration dies.
Figure 6:
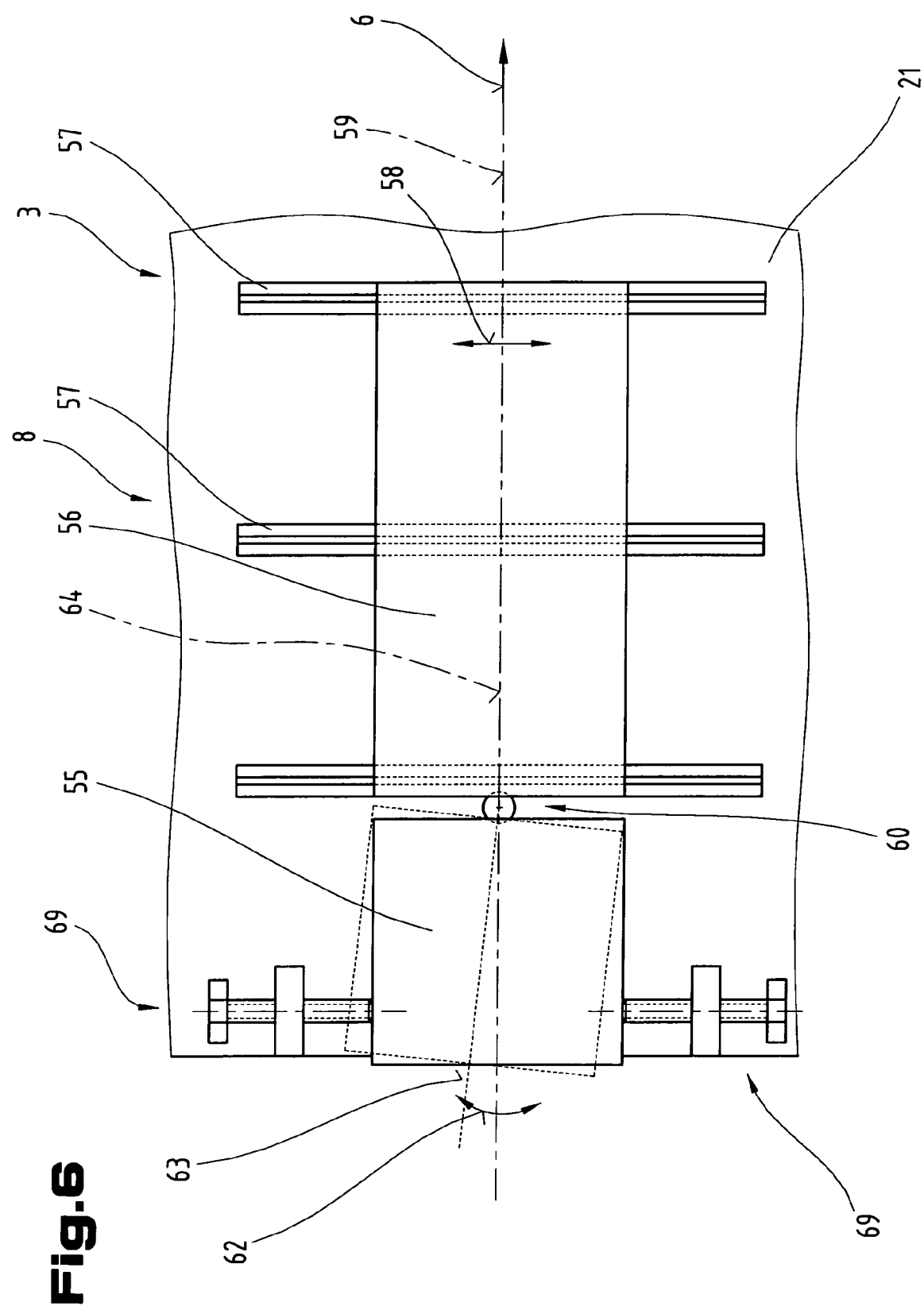
FIG. 6 is a simplified, schematic diagram showing a plan view of the shaping system illustrated in FIG. 5.
Figure 7:
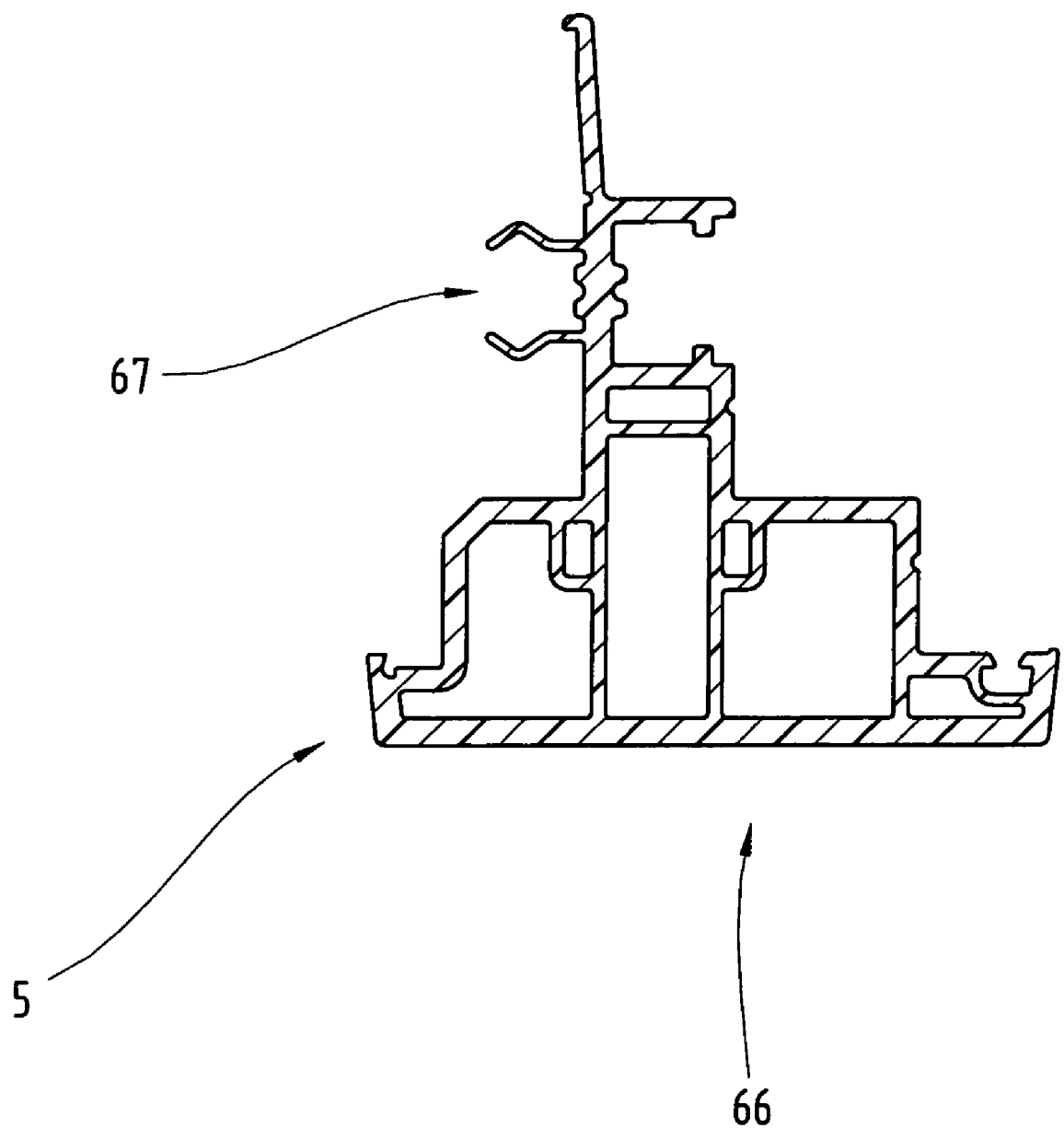
FIG. 7 shows one possible cross-section of an object with a solid profiled section part and a hollow profiled section part for orienting in the shaping system illustrated in FIGS. 5 and 6.

FIGS. 5 to 7 provide a schematically simplified illustration of another possible embodiment of the shaping system 3 in the region of the calibration dies 10 to 12 disposed one after the other, which may also be construed as an independent solution in its own right, the same reference numbers and component names as those used in connection with FIGS. 1 to 4 being used to denote the same parts. To avoid unnecessary repetition, reference may be made to the more detailed description given in connection with FIGS. 1 to 4.

At the schematically illustrated calibrating table 21, the calibration dies 10 to 12 disposed downstream of the extrusion die 7 in the extrusion direction 6 are indicated by broken lines, and the object 5 passing through it is also illustrated in a simplified format. The first calibration die 10 in the extrusion direction 6 is disposed on a schematically illustrated support plate 55 and retained on it. The other calibration dies 11 and 12 illustrated here are disposed and supported on a mounting plate 56 separate from the support plate 55, and the support plate 55 is disposed upstream of the mounting plate 56 as viewed in the extrusion direction 6. The mounting plate 56 is supported and retained on the calibrating table 21 by means of additional spacing and support elements 57. These support element 57 may also be retaining rails, in which case the mounting plate 56 may be displaced as indicated by double arrow 58 parallel with a longitudinal axis 59 of the calibrating table 21 transversely to the extrusion direction 6 relative thereto. The mounting plate 56 is preferably of a one-piece design which then also supports the calibration dies II, 12 disposed one after the other on it, and the calibration dies 11, 12 may also optionally be supplied with cooling medium, vacuum and other energy carriers via this plate.

As illustrated on a simplified basis, a joint arrangement 60 is disposed in the region between the support plate 55 and the mounting plate 56, by means of which the support plate 55 can be moved relative to the mounting plate 56 and this movement takes place in two spatial directions due to the support on the support plate 55. This joint arrangement 60 may be de-signed so that the support plate 55 is supported against the mounting plate 56 in the extrusion direction 6, thereby enabling the tensile forces transmitted by the object 5 as it passes through the calibration dies 10 due to the crawler track 4 in the region of the joint arrangement 60 to be transmitted to the mounting plate 56 and then to the calibrating table 21. The spatial displacement may take place both in a vertical direction—as indicated by double arrow 61 in FIG. 5—and in a horizontal plane—as indicated by double arrow 62 in FIG. 6—and may also be superimposed. Consequently, as illustrated in a simplified manner in FIG. 6, a calibration axis 63 of the calibration dies 10 is moved due to the pivoting or rotating movement about the joint arrangement 60 relative to the longitudinal axis 59 of the calibrating table 21 and another calibration axis 64 of the other calibration dies 11 and 12. These calibration axes 63, 64 are defined by the calibration orifices 65 extending through the individual calibration dies 10 to 12. This relative displacement of the calibration orifices 65 disposed one after the other with their calibration axes 63, 64 is intended to provide a sufficient straightness of the object 5 in its cooled or solidified state—in other words after cooling.

In the case of the object 5 illustrated in a simplified format in FIG. 7, it has a first part-portion 66 with a cavity and another part-portion 67 comprising a solid section. Accordingly, the total cross-section of the object 5 in this embodiment comprises at least the first part-portion 66 and at least the other second part-portion 67 joined to it. Due to the extrusion process, the object 5 is more or less at the same temperature throughout its cross-section as it leaves the extrusion die 7, not illustrated, in particular the extrusion nozzle 28. However, this changes immediately after entering the calibrating device 8 with its calibration dies 10 to 12, in which due to the fact that a higher quantity of heat is lost from the other part-portion 67 due to the possibility of cooling on all sides than from the first part-portion 66 with the cavity or cavities. This first part-portion 66 can only be cooled in the region of its external face in the calibration dies 10 to 12, which means that a sufficient quantity of heat is removed in the external region only.

Due to the spatial displacement of the support plate 55 and consequently the first calibration die 10 with its calibration axis 63 disposed on it by relative to the subsequent calibration dies 11 and 12 with their other calibration axis 64, the object 5 can already be oriented to ensure its straightness as it enters the calibrating device 8 depending on the relative position of the part-portion 66 comprising the hollow section and the other part-portion 67 comprising the solid section.

In the case of the object 5 illustrated in FIG. 7, where the part-portion 67 of solid material is disposed above the part-portion 66 with the cavity, the support plate 55 can be pivoted as indicated by the double arrow 61 shown in FIG. 5 out of the horizontal plane in the inlet region in the direction away from the standing surface 20, in other words upwards. This results in a longitudinal expansion or minimal stretching of the hollow first part-portion 66, as a result of which the object 5 leaves the calibration device 8 in a straight line after further cooling in the subsequent calibration dies 11, 12 and is then further cooled in the adjoining cooling chambers 14 to 16 illustrated in FIG. 1. Due to the angular displacement, the hollow part-portion 66 is stretched and lengthened compared with the solid part-portion 67 prior to the final cooling and then shrinks again later during cooling.

To enable it to be displaced out of the horizontal plane—as indicated by double arrow 61—the support plate 55 is provided with a schematically illustrated displacement device 68 on the side remote from the joint arrangement 60, which may be provided in the form of a screw or spindle arrangement, for example. By means of this displacement device 68, the support plate 55 can therefore be moved in the vertical direction by reference to the extrusion direction 6 and also secured in the adjusted position.

In FIG. 6, the support plate 55 is provided with another displacement device 69 on the side remote from the joint arrangement 60 for moving it in a horizontal plane, and it may be disposed on the calibrating table 21, acting transversely to the extrusion direction 6. This displacement device 69 may also be provided in the form of a screw or spindle arrangement or similar, by means of which a fixture or retention can be obtained relative to the subsequent calibration dies 11, 12 and the calibrating table 21.

It should be pointed out that the displacement devices 68, 69 illustrated here are given merely as examples and the essential aspect is that after the support plate 55 has been moved or displaced about the joint arrangement 60 it can be fixed and retained. The support plate 55 can not be moved in the extrusion direction 6 in this instance.

It should also be pointed out that the joint arrangement 60 illustrated is likewise merely an example of one of many which might be selected but in the embodiment illustrated as an example, it comprises a spherically shaped intermediate element with recesses of a complementary design in the support plate 55 and mounting plate 56. However, it would also be possible to use others types of joint arrangements 60, such as universal joints, elastic support elements and such like for example. Another possible embodiment of the joint arrangement 60 is illustrated in FIGS. 22 to 26.

The ranges of angles of up to 10° in the two spatial directions are provided for the respective pivot angle of movements in the direction indicated by double arrows 61 respectively 62 with respect to one another from the straight or contiguous orientation of the calibration axes 63, 64. This is dependent on the degree of variance of the object 5 from the straightness to be obtained and it may be that smaller angular ranges of between 1° and 5° will also be sufficient. It should also be pointed out that the positioning of the joint arrangement 60 between the support plate 55 and the mounting plate 56 is not limited exclusively to the position between what in this instance is the first calibration die 10 in the extrusion direction 6 and the calibration die 11 disposed immediately adjacent, and it may also be disposed between other immediately adjacent calibration dies 11, 12 etc., as indicated by broken lines in FIG. 5. The essential aspect is that the support plate 55 is designed so that it can be spatially moved relative to the subsequent mounting plate 56. The disposition of the support elements is then adapted accordingly.

Figure 8:
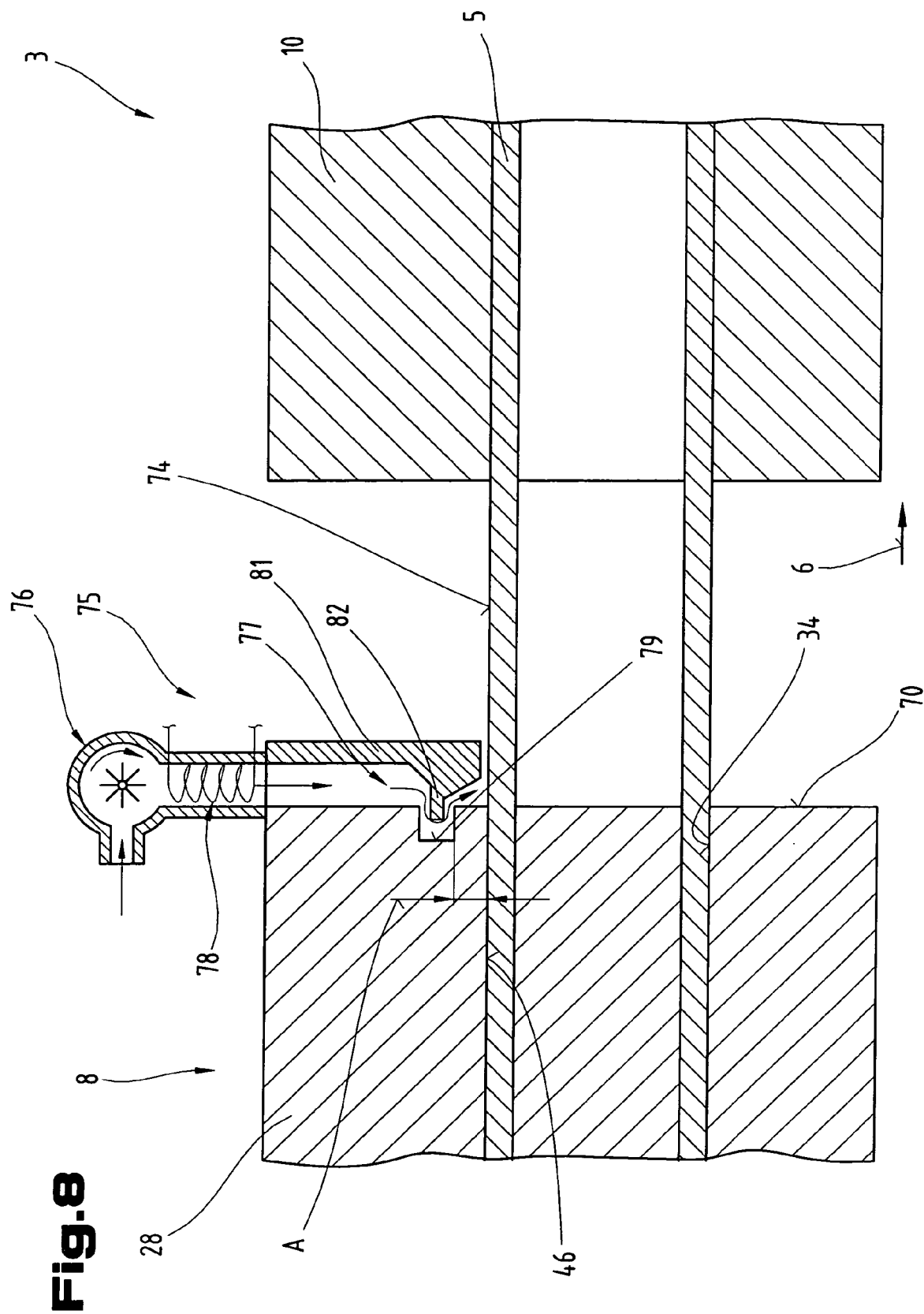
FIG. 8 is a schematic, simplified diagram showing a side view in section of a treatment device for the object leaving the extrusion die.
Figure 9:
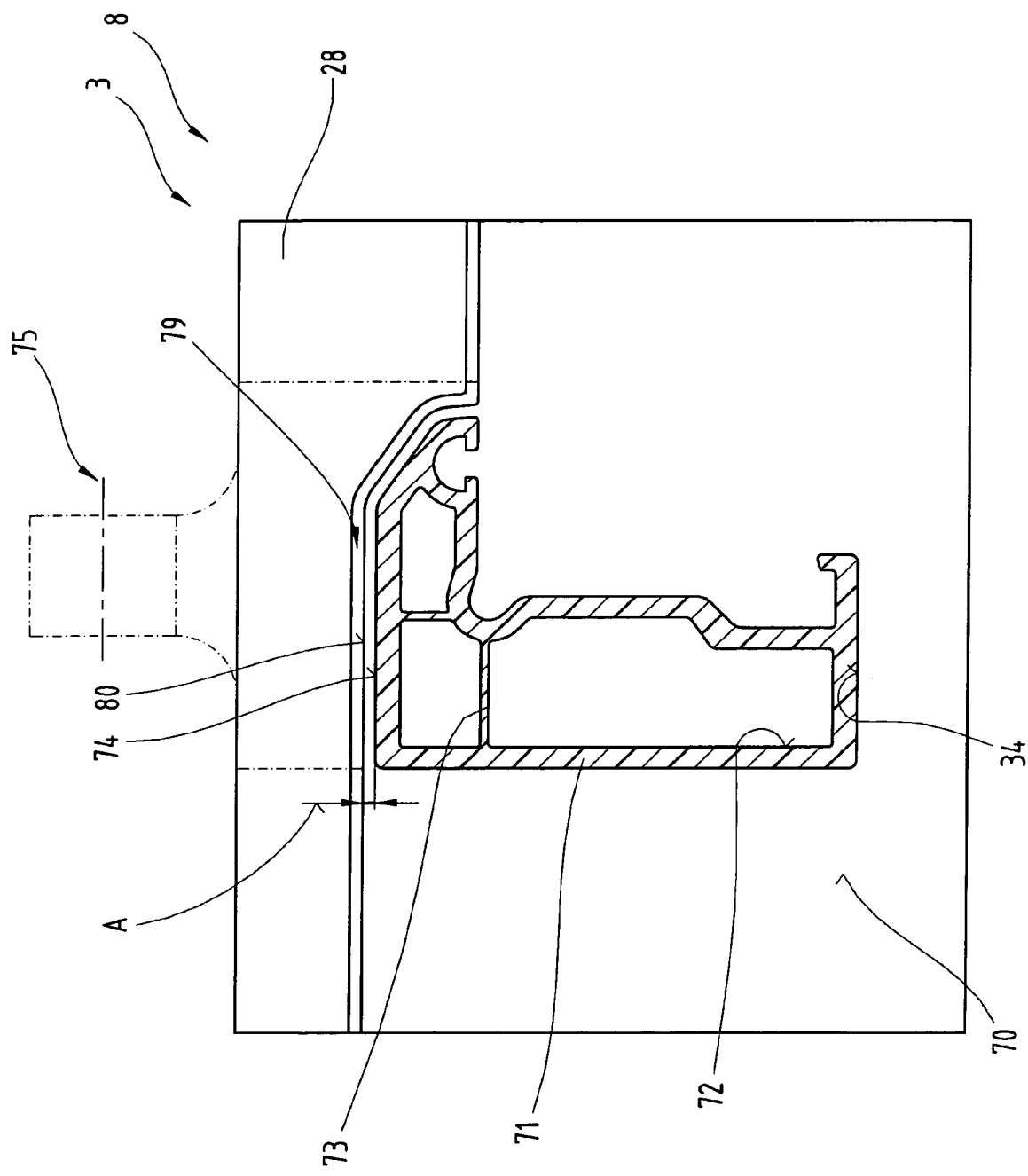
FIG. 9 is a view of the extrusion die illustrated in FIG. 8 with a schematically indicated treatment device.

FIGS. 8 and 9 illustrate another possible embodiment of the shaping system 3, which may also be construed as an independent solution, the same reference numbers and component names being used to denote the same parts as those described with reference to the previous FIGS. 1 to 7. To avoid unnecessary repetition, reference may be made to the more detailed description given with reference to FIGS. 1 to 7 above.

The part-region of the shaping system 3 illustrated here shows the extrusion die 8, in particular the extrusion nozzle 28, and the first calibration die 10 disposed after it in the extrusion direction 6. The object 5 to be produced is also illustrated in a simplified format and leaves the extrusion die 8 via an extrusion nozzle 28 in the region of an end face 70. The passage 34 inside the extrusion nozzle 28 is also illustrated in a simplified format, its purpose being to shape the object 5, which comprises a hollow section with a peripherally extending jacket 71 and webs 73 disposed in a profiled chamber 72. It should be pointed out that the profiled cross-section of the object 5 is just one example of many possible cross-sectional shapes.

A treatment device 75 is provided in the region of the end face 70 for treating at least certain regions of the external surface 74 of the object 5 as it leaves the extrusion nozzle 28.

The purpose of this treatment device 75 is to apply a pre-definable quantity of heat to a pre-definable portion of the external surface 74 of the object 5 and thus treat the surface 74. Depending on the temperature selected, this can lead to an increase in the degree of smoothness and hence an associated reduction in the surface roughness. The treatment medium is preferably a gaseous medium, in particular air, drawn from the ambient air, which is applied to the surface 74 by means of a blower via a flow passage 77. Disposed inside the flow passage 77 is a schematically illustrated tempering element 78, which tempers the medium circulating through the flow passage 77 adjoining the blower 76 to a pre-definable value. However, it would also be possible to feed medium that has already been pre-heated to the flow passage 77, in which case the exact degree of heating will be applied by the tempering element 78.

Irrespective of the above, however, another option instead of drawing the gaseous medium from the ambient air would be to draw it from a supply container, not illustrated, and direct it through the flow passage 77 to the surface 74 in order to treat the object 5. If the gaseous medium is placed under pressure, the blower 76 can be dispensed with, in which case an appropriate system for controlling the pressure and quantity of gaseous medium is provided.

The flow passage 77 opens into a deflector passage 79 recessed into the end face 70, which is disposed in the extrusion nozzle 28 at least in the region of the surface 74 to be treated. However, this deflector passage 79 preferably extends on both sides—irrespective of the profiled geometry—as far as the side peripheral region of the extrusion nozzle 28. This deflector passage 79 extends in the portion of the surface 74 to be treated, immediately adjacent to the passage wall 46 of the passage 34, and a distance A between the passage wall 46 bounding the passage 34 and a passage side wall 80 which preferably extends parallel with it is selected so that it is relatively short in order to ensure a uniformly directed flow of tempering medium onto the surface 74 of the object 5 to be treated after passing through the deflector passage 79. Accordingly, the distance A is between 0.5 mm and 3.0 mm. The cross-section of the deflector passage 79 as viewed in the direction perpendicular to the extrusion direction 6 may vary and depends on the quantity of circulating treatment medium, the deflection of the treatment medium and the temperature selected for the treatment. The treatment medium in the outlet region from the deflector passage 79 should be at a temperature of between 180° C. and 300° C., preferably between 190° C. and 250° C.

In the embodiment illustrated as an example here, the flow passage 77 in the region of the end face 70 is bounded by a baffle element 81 which is preferably oriented parallel with it, spaced at a distance apart from the end face 70, and which lies against the end face 70 in the region in which treatment medium must be prevented from escaping and in the region in which no treatment is applied. Accordingly, a part of the flow passage 77 extends between the end face 70 and the baffle element 81. As described above, it opens into the deflector passage 79 and in this instance the baffle element 81 has a shoulder 82 projecting in the direction wards the deflector passage 79. This shoulder 82 projects out from the baffle element 81 in the direction towards the end face 70 of the extrusion nozzle 28 and if necessary may also project into at least certain regions of the deflector passage 79. In the transition region between the baffle element 81 and the shoulder 82, baffle surfaces oriented at an angle to the flow direction may be provided in order to improve the flow, which assist in deflecting the treatment medium into the deflector passage 79 and back out of it again.

The deflector passage 79 co-operating with the shoulder 82 of the baffle element 81 forms a deflection device for the flow of treatment medium. The treatment medium is directed in the region of the flow passage 77 parallel with the end face 70 to the shoulder 82 and deflector passage 79, where the flow movement is firstly directed in the direction opposite the extrusion direction 6 and then back in the extrusion direction 6 again. This deflection causes the treatment medium to flow into the outlet region from the deflector passage 79 at a pre-definable angle with respect to the extrusion direction 6. The important aspect is that the treatment medium, having passed through the deflector passage 79, is directed out of the extrusion die 8 away in the extrusion direction 6 of the subsequent calibration die 10, thereby avoiding any detrimental temperature effects of the extrusion nozzle 28. When the treatment medium has been sufficiently heated by the tempering element 78, any undesirable cooling of the extrusion nozzle 28 in the region of the treatment device 75 is prevented, which means that there is no need to provide additional heating elements here.

Figure 10:
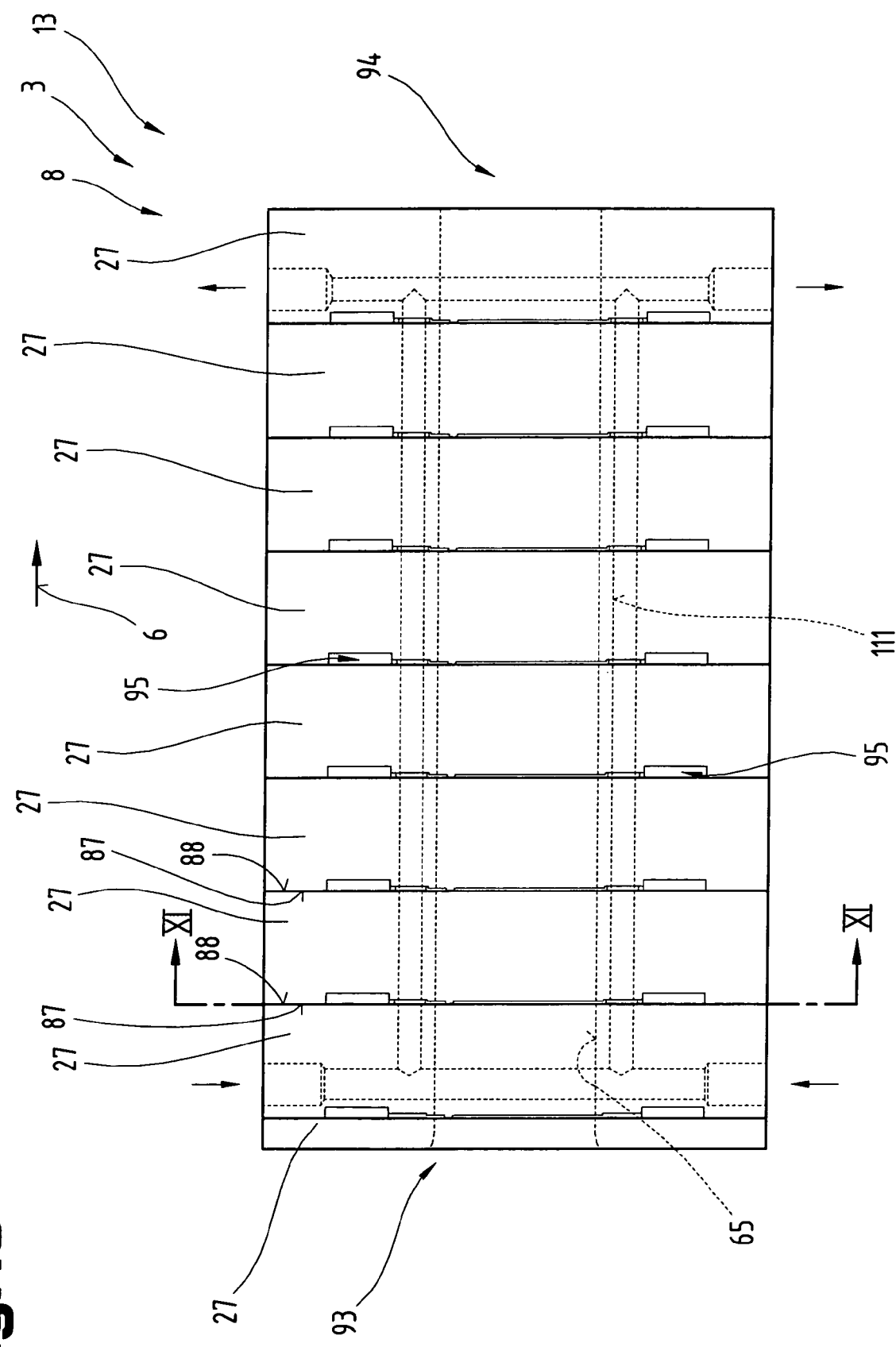
FIG. 10 is a plan view showing another possible embodiment of the extrusion die with the cover plate removed.
Figure 11:
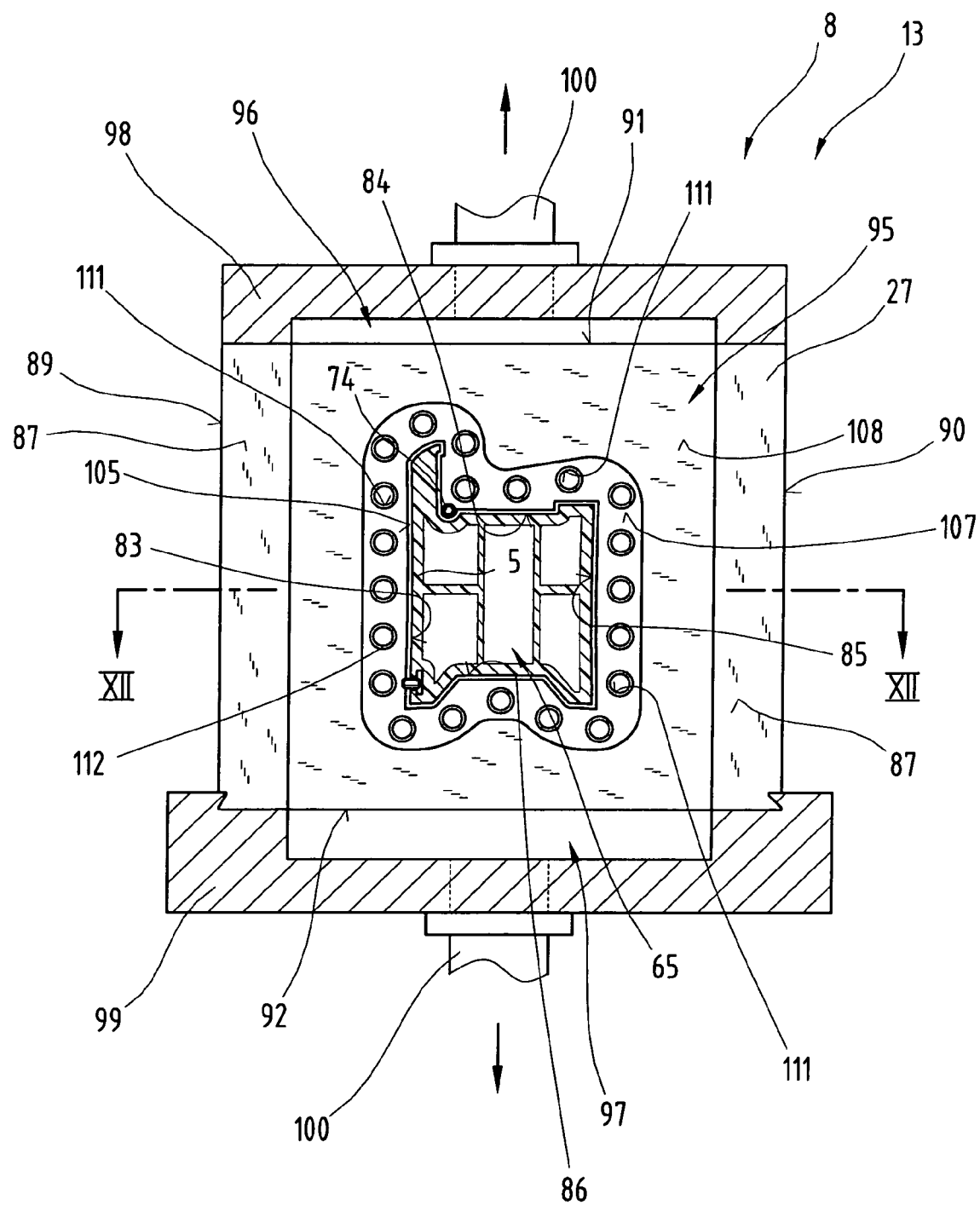
FIG. 11 is a view in section showing the extrusion die illustrated in FIG. 10 along line XI-XI indicated in FIG. 10.
Figure 12:
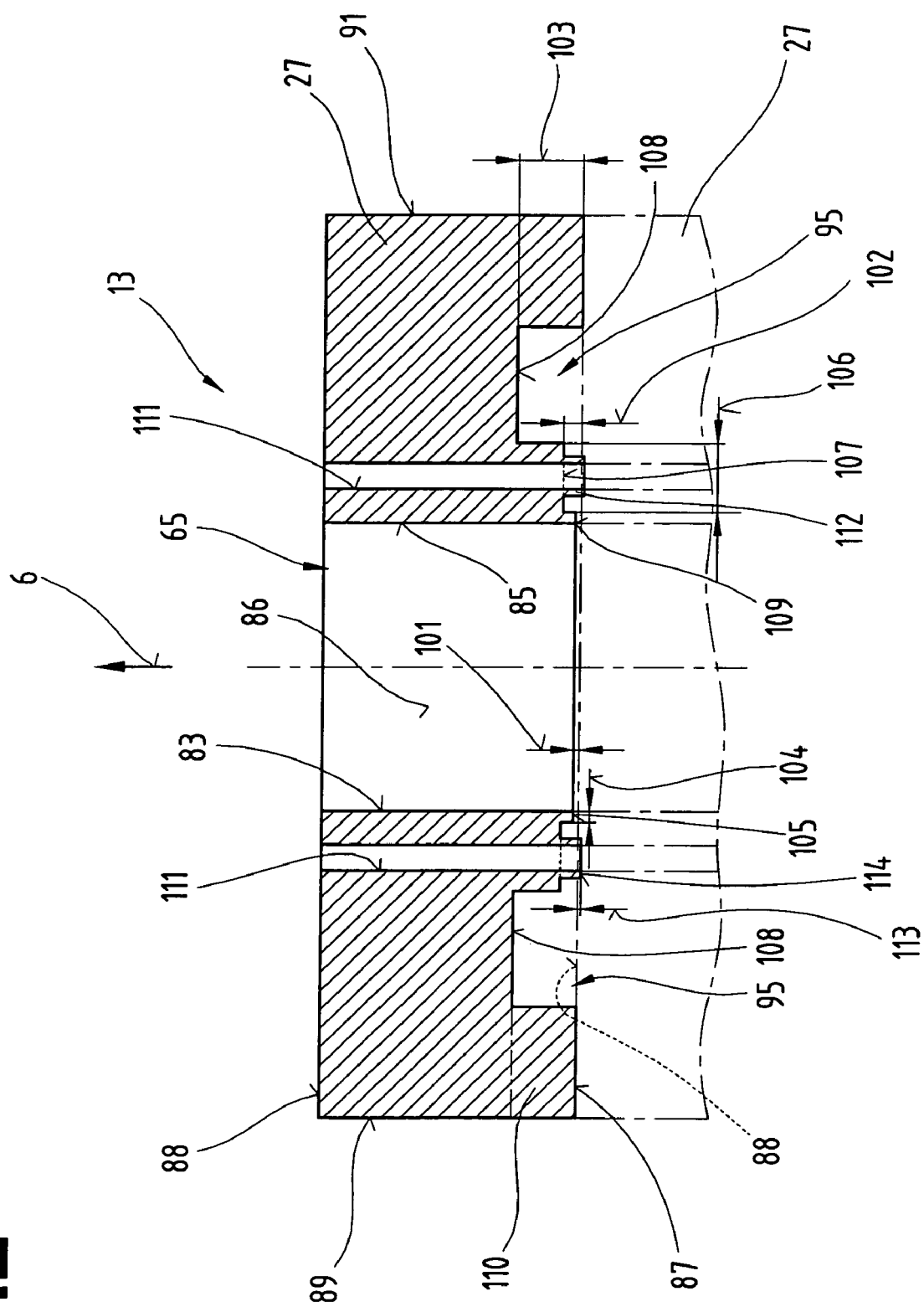
FIG. 12 is a plan view in section showing a calibration plate of the extrusion die illustrated in FIGS. 10 and 11 along line XII-XII indicated in FIG. 11.

FIGS. 10 to 12 provide a schematic illustration of one possible embodiment of one of the calibration dies—in this particular instance the calibration die 13—which may be construed as an independent solution in its own right, the same reference numbers and component names being used to denote the same parts as those described in connection with FIGS. 1 to 9 above. To avoid unnecessary repetition, reference may be made to the more detailed description given above in connection with FIGS. 1 to 9.

The calibration die 13 has been selected as but one example to illustrate the disposition shown in the diagram of FIG. 1, and the other calibration dies 10 to 12 illustrated may also be of the same type as the calibration die 13 illustrated and described. The individual, calibration plates 27 disposed one after the other are an assembled unit constituting one of the calibration dies and delimit at least one calibration orifice 65 for the object 5 to be fed through. This calibration orifice 65 has several schematically illustrated shaping surfaces 83 to 86 along which at least one object 5 to be fed through passes.

Perpendicular to the shaping surfaces 83 to 86 and spaced at a distance apart from one another in the extrusion direction 6, the individual calibration plates 27 have end faces 87, 88 extending parallel with one another and side faces 89 to 92 extending between them. In the embodiment illustrated as an example here, the two oppositely lying side faces 89, 90 are disposed on either side of the calibration orifice 65, and the other side faces 91, 92 are disposed on the top and bottom face of the calibration plates 27. As a result of the extrusion direction 6 selected in this diagram, the first end face 87 in the example illustrated as an embodiment here is directed towards an inlet region 93 and the second or other end face 88 is directed towards an outlet region 94 for the object 5 to be fed through.

As may be seen in particular from the diagrams of FIGS. 10 and 12, at least one cavity 95 is disposed between at least two immediately adjacent calibration plates 27 and the mutually facing end faces 87, 88, which extends from the calibration orifice 65 and the shaping surfaces 83 to 86 bounding it to a passage 96, 97 and opens into the latter. However, it would also be possible to provide the cavity 95 with only one of the passages 96, 97, in which case the number of passages can be freely selected depending on the negative pressure to be generated in the cavity 95. The two passages 96, 97 are preferably recessed into a cover or base plate 98, 99 and, as schematically illustrated, at least one of the passages 96, 97 is connected via a connector to a suction line 100 of a suction system, for example a vacuum generator, although this is not illustrated here.

In the region of their end faces 87, 88, the individual calibration plates 27 of the schematically illustrated calibration die 13 disposed one after the other and immediately adjacent to one another are designed so that they lie one against the other by their mutually facing end faces 87, 88, thereby enabling a virtually complete seal to be obtained due to the flat contact of the surfaces. The same also applies to the contact surfaces of the cover or base plate 98, 99 in the contact region against the side faces 91, 92, so that a sufficient sealing effect can be obtained here, and because the suction device is connected to the passage 96, 97, a pressure that is below the ambient pressure can be generated throughout the entire cavity 95.

As may be seen from a comparison of FIGS. 11 and 12, the cavity 95 respectively the cavities are open across a predominant part of the circumference of the calibration orifice 65 in the direction of the calibration orifice 65 bounded by the shaping surfaces 83 to 86. Consequently it is possible to subject the object 5 to be fed through more or less entirely to an air pressure that is below the external air pressure in the region of its external surfaces, in other words the facing the shaping surfaces 83 to 86, as a result of which the ambient pressure in the cavities of the of the object 5 has an enhanced effect and a pressure difference can be generated between the cavities of the object 5 and the external surface of the object 5. As a result of this pressure difference generated in certain regions around the circumference of the calibration orifice 65, the still tough-plastic object 5 is sucked against the shaping surfaces 83 to 86, so that the external surface of the object 5 sits in contact with the shaping surfaces 83 to 86 on the one hand and, depending on the additional cooling of the object 5—which will be described in more detail below—the heat applied during the extrusion process is fed away again on the other hand, thereby fixing the desired cross-sectional shape of the object 5.

In this example of an embodiment, the cavity 95 has a differing width 101 to 103 from the shaping surfaces 83 to 86, as measured in the direction parallel with the shaping surfaces 83 to 86, which becomes bigger the greater the distance from the shaping surfaces 83 to 86 in the extrusion direction 6.

As may best be seen from FIG. 12, the cavity 95 has a first distance 104 of 0.3 mm to 5.0 mm, preferably 0.5 mm to 2.0 mm, between the illustrated calibration plates 27 in the region of the mutually facing end faces 87, 88, and a width 101 of between 0.2 mm and 3.0 mm, preferably between 0.4 mm and 1.0 mm, starting from one of the shaping surfaces 83 to 86 in the direction perpendicular thereto, and first part-end faces 105 are formed on the calibration plate 27 in this region. Accordingly, the cavity 95 forms a gap across the length of the first part-end face 105, in other words in the direction of the first distance 104, and the first width 101 can be selected depending on the profiled shape of the object 5 to be calibrated and due to the pressure difference to be generated between the cavity 95 and the cavities of the object 5 in the specified dimensions.

Adjoining the first distance 104, the cavity 95 has another distance 106, starting from this first distance 104, of 6.0 mm to 20 mm, and, likewise in the direction perpendicular to the shaping surfaces 83 to 86, a width 102 of between 1.0 mm and 2.5 mm, and second part-end faces 107 are again formed on the calibration plate 27. Adjoining the second distance 106, the cavity 95 has a width 103 of between 2.5 mm and 10.0 mm, and third part-end faces 108 are formed on the calibration plate 27. The specified widths 101 to 103 extend respectively from the end face 88 of the calibration plate 27 disposed upstream to the individual part-end faces 105, 107 and 108.

In the embodiment illustrated as an example here, the part-end faces 105, 107 and 108 are oriented parallel with the end faces 87, 88 but are spaced apart from them by the widths 101 to 103. As a result of the different widths 101 to 103, the volume of the cavity 95 becomes larger the greater the distance or lengths from the calibration orifice 65, thereby enabling flow losses generated as the negative pressure is generated in the cavity 95 to be compensated, even across longer flow paths as far as the region of the first part-end faces 105, thereby enabling a virtually uniform negative pressure to be generated around the circumference of the calibration orifice 65. As a result, a uniform pressure difference between the external face and the cavity of the object 5 can be generated around virtually the entire circumference of the object 5 to be cooled.

In order to expose different wall thicknesses of the object 5 to a negative pressure and thus generate intended pressure differences around the circumference, for example, another option is to select a different design for the width 101 between the first part-end face 105 and the co-operating end face 88 of the calibration plate 27 immediately before it around the circumference of the calibration orifice 65. This being the case, care must be taken to ensure that the negative pressure in the region of the cavity 95 is selected so that the pressure difference generated between the cavities of the object 5 and the cavity 95 is adapted to the degree of cooling of the object 5. If the object 5 to be cooled is still relatively soft, i.e. it is still tough-plastic, a pressure difference must be selected which is smaller than in the region in which the object 5 has already cooled to a greater degree and the external jacket forming the object 5 already exhibits a certain intrinsic stiffness. If too high a pressure difference were selected, a positive connection could occur in the region between the first part-end face 105 and other end face 88 of the calibration plate 27 immediately before it directed towards it, which would damage the object 5 to be cooled. At least certain regions of the external surface of the object 5 would be sucked into the gap between the first part-end face 105, as a result of which a positive connection would form in at least certain regions around the circumference of the object 5. To improve the passage of the object 5 to be cooled through the individual calibration plates 27, it is of advantage if a radius 109 is provided in the transition region between the shaping surfaces 83 to 86 and the immediately adjacent first part-end faces 105, which may have a size of between 0.1 mm and 1.0 mm. However, it would also be possible to select a radius 109 of any other dimensions.

In the region of the two oppositely lying side faces 89, 90, which is vertically oriented in the embodiment illustrated as an example here, the cavity 95 is bounded by at least two strip-shaped components 110 on the side remote from the calibration orifice 65, as schematically indicated by a dotted-dashed line in the left-hand part of FIG. 12. However, it would also be possible for the strip-shaped component 110 to be integrally joined to the calibration plates 27, in which case the individual calibration plates 27 are of an integral design. This will be the case if the cavity 95 is formed by a recess in one of the end faces 87, 88 of the calibration plates 27. This recess may be produced by milling it out, for example, and the milling depth will be the same as the corresponding width 101 to 103 for forming the cavity 95. In the embodiment illustrated as an example here, in particular the diagram of FIG. 11, the cavity 95 in the region of the other mutually opposite side faces 91, 92 opens into at least one of the passages 96, 97.

In the embodiment illustrated as an example here, the individual part-end faces 105, 107 and 108 are directed towards the inlet region 93 of the object 5 to be fed through the calibrating device 8. However, it would also be possible for the individual part-end faces 105, 107 and 108 to be directed towards the other end face 88 remote therefrom, —in other words towards the outlet region 94.

By providing the cavity 95 around virtually the entire circumference of the object 5, the calibration orifice 65 in the individual calibration plates 27 immediately adjacent to it can be provided with several inlet ports 111 for a tempering medium, not illustrated, and these inlet ports 111 are more or less evenly distributed round the circumference of the calibration orifice 65, causing the heat to be drawn away uniformly around the entire external surface of the object 5 lying along and sliding along the shaping surfaces 83 to 86.

The individual inlet ports 111 extend through the calibration plates 27 in the direction parallel with the shaping surfaces 83 to 86 and are also oriented perpendicular to the end faces 87, 88. In order to produce calibration plates 27 of the same design, it is of advantage if the inlet ports 111 are each disposed congruently with one another in the immediately adjacent calibration plates 27 and extend through the calibration plates 27 in the region of the second part-end face 107. As a result of this arrangement, it is possible for tempering medium fed through the inlet port, in particular a cooling medium, to be fed close to the shaping surfaces 83 to 86, thereby resulting in an efficient removal of heat.

Due to the spacing of the second part-end faces 107 from the other end face 88 directed towards them, a sealed transition of the inlet ports 111 is formed between the calibration plates 27 disposed immediately one after the other. Since the inlet ports 111 in the individual calibration plates 27 are disposed congruently with one another and one after the other, a shoulder 12 is formed on the calibration plate 27, in the region of the second part-end face 107, projecting in the direction towards the end face 88 disposed upstream, which is preferably formed integrally with the calibration plate 27. It may be produced by removing an appropriate amount of material from the end face 87, for example, and the inlet port 111 is formed in the centre of the shoulder 112. The shoulders 112 are disposed centrally with respect to the inlet port 111 and extend out from the end face 87 by a minimal dimension 113, as a result of which the shoulder 112 forms a metal sealing ring with the end face 88 disposed upstream of it when the two lie against one another. This dimension 113 may be between 0.005 mm and 0.1 mm, preferably between 0.01 mm and 0.03 mm. The projecting shoulder 112 therefore forms a sealing surface 114 at its end face, which affords a continuous seal for the inlet port 111 when the calibration plates 27 are disposed one after the other. Consequently, the cooling medium can be fed through the inlet port 111 from the inlet region 93 to the outlet region 94. However, it would also be possible to operate in the opposite flow direction. The important thing is that the inlet ports 111 disposed one immediately after the other provide a fluid-tight seal and thus prevent the cooling medium from escaping in the respective transfer region between the individual calibration plates 27 in the region of the sealing surfaces 114 and if necessary the end faces 87. This means that no additional sealing means or devices have to be provided in order to connect the inlet ports 111 disposed one after the other in a sealed manner for feeding the cooling medium through.

Due to the slight projection of the shoulder 112 out from the end face 87—which has been over-exaggerated in the diagram in order to provide a clearer illustration—a sealing effect, albeit incomplete, can still be obtained between the mutually facing end faces 87, 88 due to the elastic or plastic deformation of the mutually abutting calibration plates 27, even in the region of the cavity 95. A minimal gap is left between the end faces 87, 88, and only a small amount of foreign air is sucked into the cavity 95 from the external environment, and this has absolutely no negative effect or significantly less effect on the object 5 to be fed through the calibration orifice 65 than if a cooling medium were fed through in the region of the inlet ports 111.

FIGS. 13 to 17 illustrate another possible embodiment of the extrusion die 7 of the shaping system 3, which may also be construed as an independent solution in its own right, and the same reference numbers and component names are used to denote the same parts as those described in connection with FIGS. 1 to 12 above. To avoid unnecessary repetition, reference may be made to the more detailed description given in connection with FIGS. 1 to 12 above.

Figure 13:
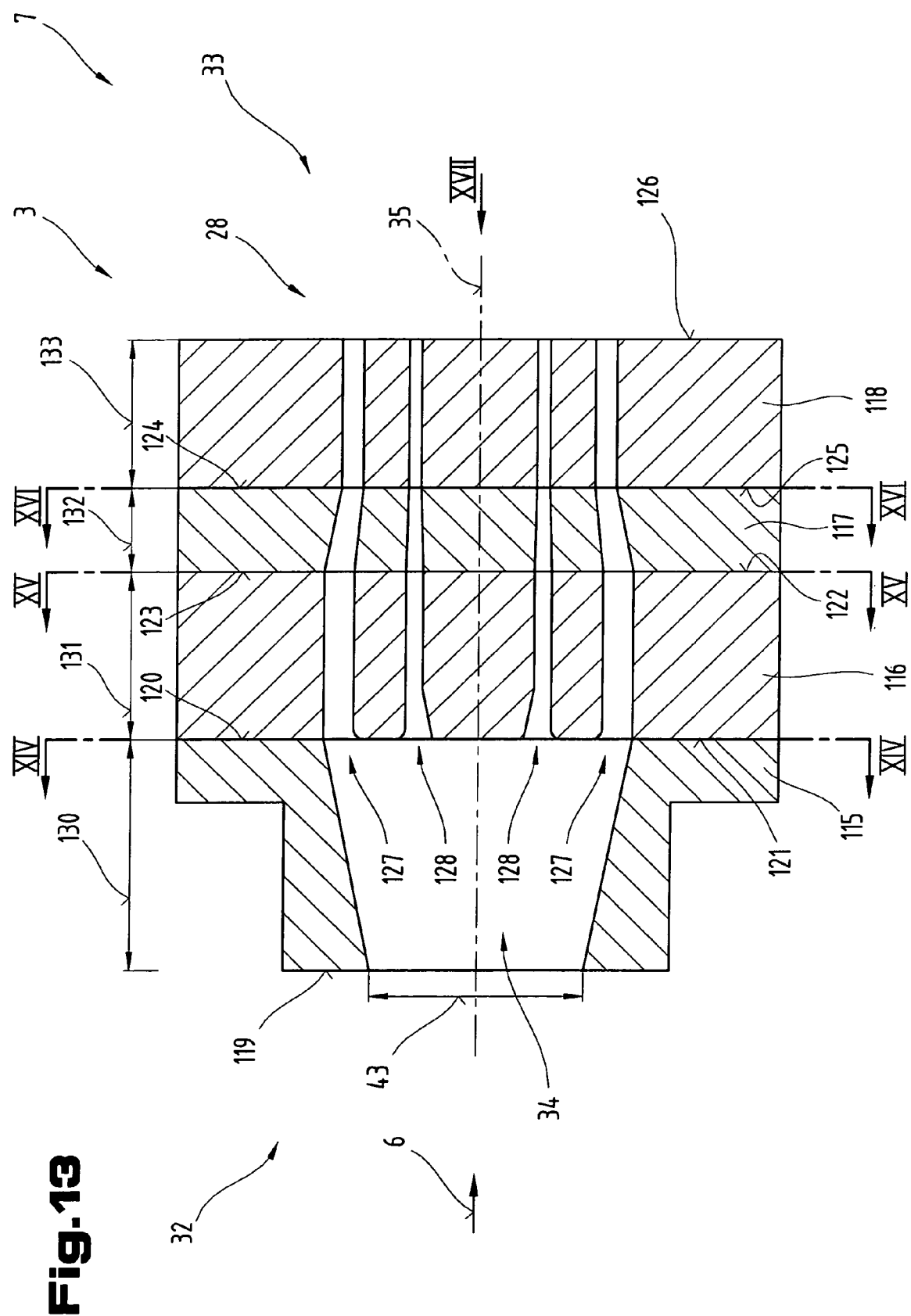
FIG. 13 is a simplified, schematic diagram showing a side view in section of a different embodiment of an extrusion die.
Figure 14:
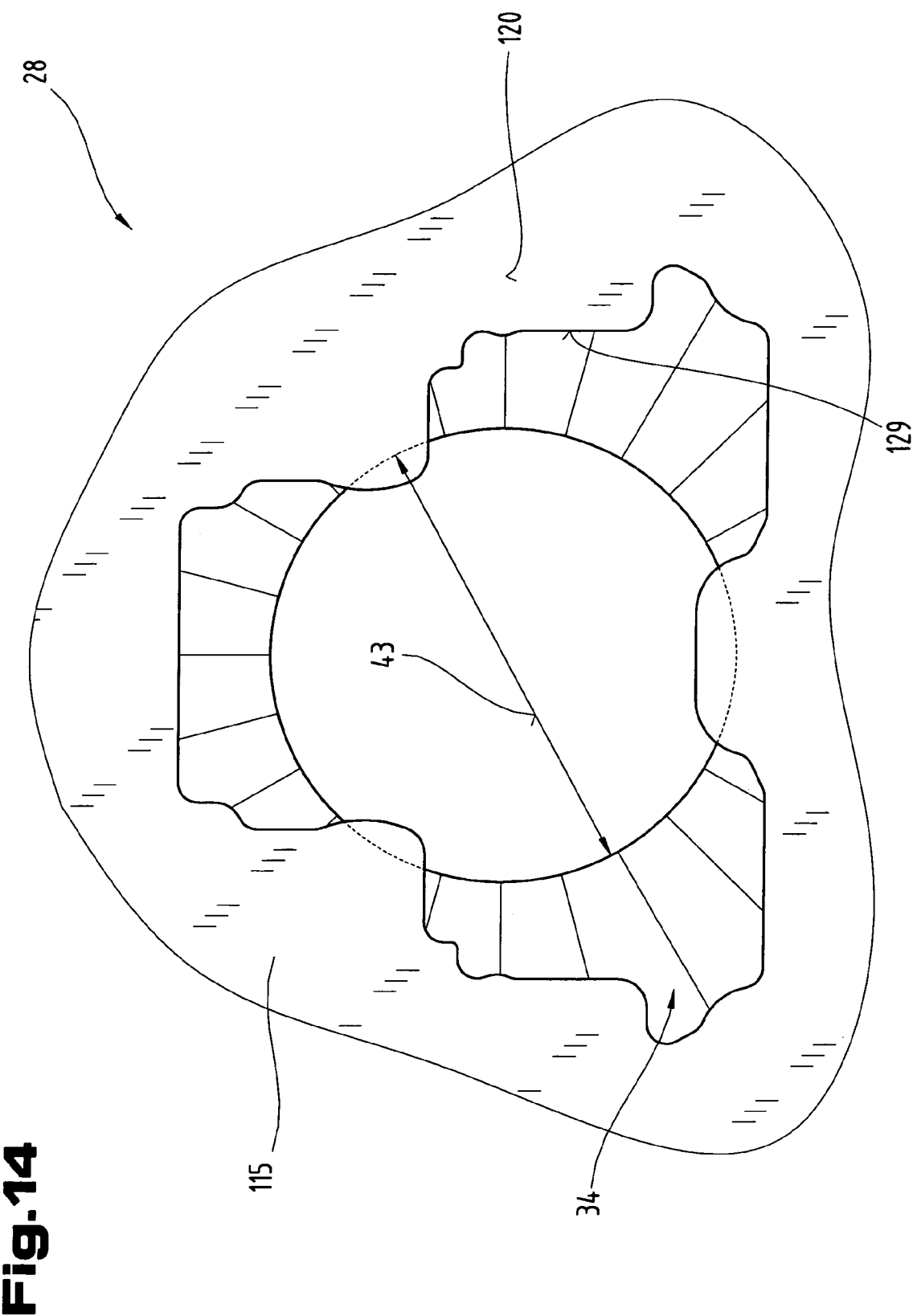
FIG. 14 is a view in section showing one possible passage design in the inlet region of the extrusion die illustrated in FIG. 13 along line XIV-XIV indicated in FIG. 13.

In the embodiment illustrated as an example here—in particular in FIG. 13—the extrusion die 7, which may also be termed an extrusion nozzle 28, has several nozzle plates 115 to 118 disposed one after the other in the extrusion direction 6 and mutually abutting. It should be pointed out that the number of nozzle plates 115 to 118 illustrated here is selected purely as an example and the number of nozzle plates may be between three and seven, for example.

The first nozzle plate 115 in the extrusion direction 6 constitutes the inlet region 32 for the strand of melt leaving the extruder 2, not illustrated, and bounds the passage 34. In the inlet region 32, the passage 34 has a passage cross-section 43, which becomes wider in the extrusion direction 6 as viewed from the center.

The nozzle plate 115 has end faces 119, 120 oriented perpendicular or normal to the longitudinal axis 35 in each case and spaced at a distance apart in the extrusion direction 6, which bound the nozzle plate 115 and hence also the passage 34 as viewed in the extrusion direction 6. The immediately adjacent and mutually abutting nozzle plate 116 also has end faces 121, 122 oriented perpendicular to the longitudinal axis 35, which therefore bound the nozzle plate 116 as viewed in the direction of the longitudinal axis 35. The other nozzle plates 117, 118 also have end faces 123 to 126 oriented perpendicular to the longitudinal axis 35. The end face 126 is directed towards the outlet region 33 for the plastic melt passing through the extrusion nozzle 28 and forms a so-called nozzle lip for it. It should be pointed out that, in the region of the end face 126 of the nozzle plate 118, the object 5 to be produced has already assumed its rough cross-sectional shape to the degree that the ultimate fixing and shaping or solidification of the object 5 takes place in the downstream parts of the plant, for example the calibrating device 8 with the calibration dies 9 to 13, not illustrated, and optionally the cooling chambers 14 to 16.

As schematically illustrated, in the region of the other nozzle plate 116 directly adjoining the first nozzle plate 115, the common passage 34 in the nozzle plate 115 is sub-divided or split into several part-passages 127, 128. In the subsequent other nozzle plates 117, 118, there is a reduction in the external dimensions of the part-passages 127, 128, where the individual, mutually separated part-passages 127, 128 merge to the profiled geometry of the object 5 to be produced.

FIGS. 14 to 17 illustrate one possible example of an embodiment of the so-called widened passage layout inside the extrusion nozzle 28, which becomes larger or wider in its cross-section starting from the first passage cross-section 43, which is preferably circular, and which is dependent on the mouthpiece or connecting piece of the extruder. Adjoining this, the common passage 34, now of a wider cross-section, and hence also the plastic melt circulating through it is split into several individual part-passages 127, 28, after which the individual part-passages 127, 28 reduce in their cross-section in the region of the outlet region 33 and are merged back with one another in terms of their relative position. The first nozzle plate 115 in the extrusion direction has the preferably circular passage cross-section 43 in the inlet region 32, as briefly described above, which forms a widened and cohesive passage cross-section 129 in the region of the other end face 120. The selected shape of the passage cross-section 129 will depend on the profiled geometry of the object 5 to be produced and care must be taken to ensure that there is a uniform split of the melt flow from the common passage 34 through to the part-passages 127, 28.

Figure 15:
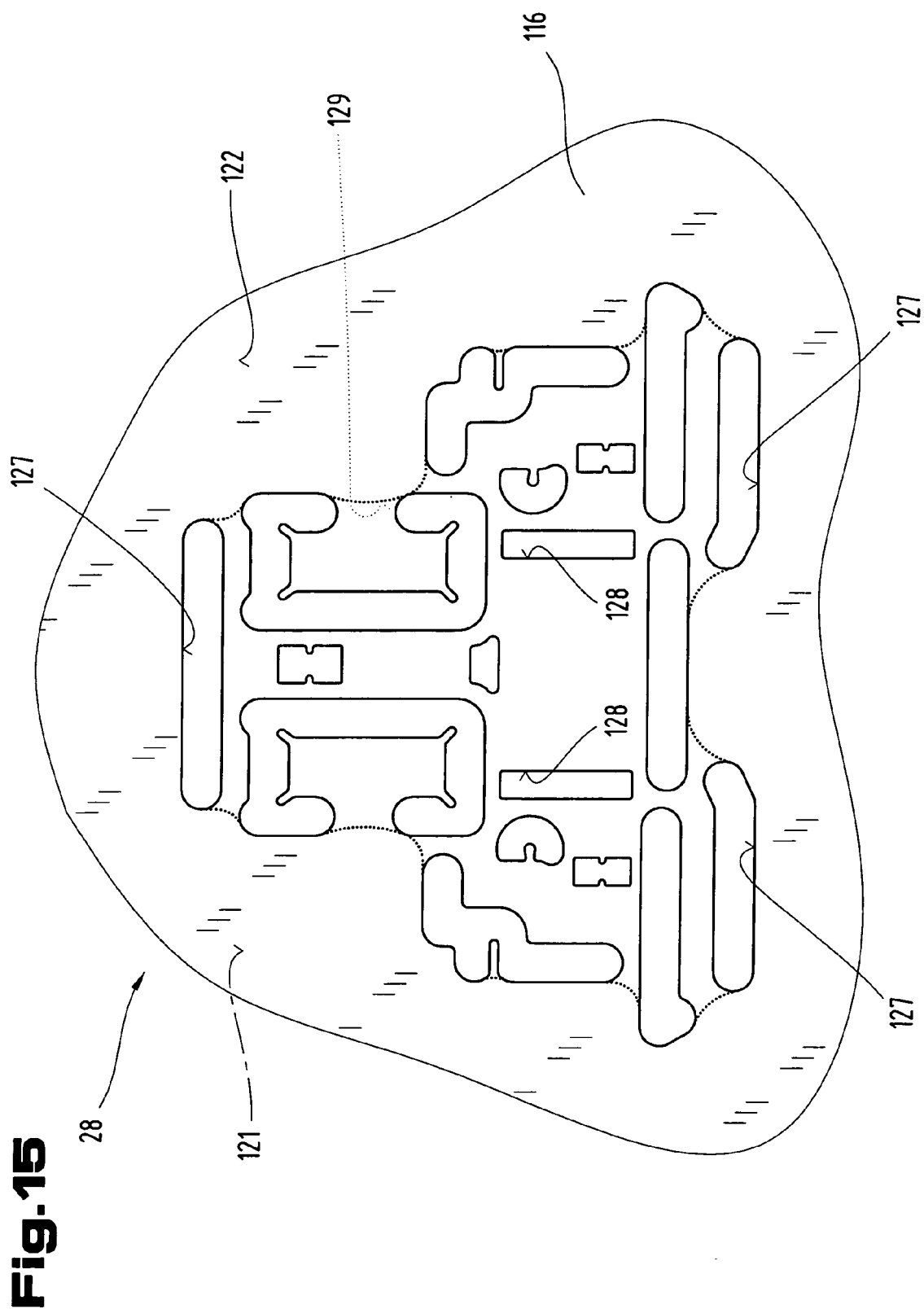
FIG. 15 is a view in section showing the passage design of the extrusion die illustrated in FIGS. 13 und 14 along line XV-XV indicated in FIG. 13.

FIG. 15 provides a simplified illustration of the other nozzle plate 116 with its end face 122 and the part-passages 127, 28 disposed in it, and it should be pointed out that the schematically illustrated part-passages 127, 128 represent but one of many possible options and will depend on the intended profiled geometry. The individual part-passages 127, 28 extend through the nozzle plate 116 parallel with the longitudinal axis 35 and perpendicular to the end faces 121, 122. Furthermore, disposed in the region of the part-passages disposed at the circumference or periphery of the object 5 to be produced is the passage cross-section 129, in the region of the end face 120 of the nozzle plate 115, as indicated in by dotted-dashed lines. As may be seen, more or less in the middle region of the extrusion nozzle 28—in this instance in the region of the nozzle plate 116—the individual part-passages 127, 128 have an external contour or cross-sectional shape conforming to part-regions or part-portions of the object 5 to be produced, but the individual part-passages 127, 128 extend through the nozzle plate 116 separately from one another and spaced apart from one another in the direction perpendicular to the extrusion direction 6. The part-passage 127, 128 in the second nozzle plate 116 between the two mutually spaced end faces 121, 122 also has a constant passage cross-section, and the passage cross-sections of the part-passages 127, 128 are bigger in terms of their cross-sectional surface area than the cross-sectional surface area of the part-portions of the object 5 to be produced.

Due to the fact that the part-passages 127, 128 extend separately and spaced at a distance apart from one another, it is possible to provide a variety of treatment devices for the plastic melt circulating through the part-passages 127, 128 between the individual part-passages 127, 128, although these are not illustrated here in order to retain better clarity. These treatment devices may be of the type listed below and may be operated in any combination with one another to produce cooling, heating, radiation, vibrations, for example. To this end, although not illustrated, inlet and outlet lines and other passages may be provided to enable the treatment devices to be supplied with various types of operating media, such as coolant water, electrical power, tempering medium, etc.

Another advantage of opting for mutually separated and wider passages inside the nozzle plate 116 is the fact that corrections to the profiled geometry of the object 5 only need to be dealt with by finishing work on individual portions of the part-passages 127, 128 without having to change all the nozzle plates. The external envelope of the part-passages 127, 128 in the second nozzle plate 116 corresponds to the passage cross-section 129 of the common upstream passage 34 in the first nozzle plate 115. This ensures that all the part-passages 127, 128 inside the nozzle plate 116 can be supplied with sufficient prepared plastic melt during the extrusion process.

Figure 16:
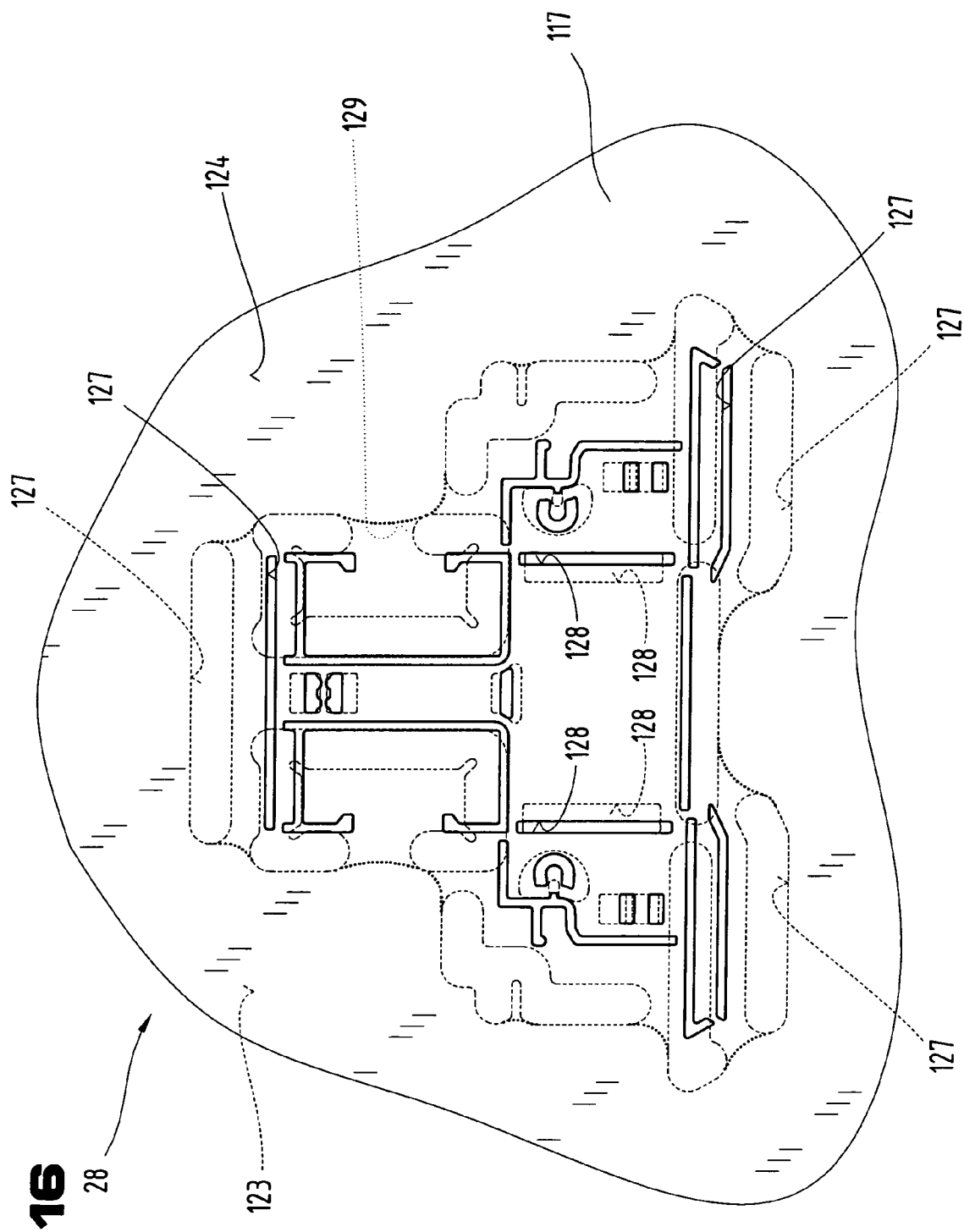
FIG. 16 is a view in section showing the passage design of the extrusion die illustrated in FIGS. 13 to 15 along line XVI-XVI indicated in FIG. 13.

FIG. 16 illustrates the individual part-passages 127, 128 respectively in the region of the two end faces 123, 124 of the nozzle plate 117 spaced apart from one another in the extrusion direction 6. The contours of the part-passages 127, 128 in the region of the first end face 123, which faces the nozzle plate 116 immediately upstream of it with its end face 122, are shown by broken lines and the contours of the part-passages 127, 128 in the region of the other end face 124 are shown by fine solid lines. In order to retain better clarity, the part-passage lines between the two mutually spaced end faces 123, 124 have been omitted. The disposition of the part-passages 127, 128 in the region of what in this instance is the first end face 123 of the nozzle plate 117 is the same as the disposition of the part-passages 127, 28 in the region of the end face 122 of the nozzle plate 116 immediately upstream. FIG. 16 illustrates the approximate contour of the object 5 to be produced already on leaving the part-passages 127, 128 indicated by fine solid lines and, as clearly illustrated, both the individual part-passages 127 between the two mutually spaced end faces 123, 124 have a decreasing passage cross-section and in terms of their relative position to one another, they now extend closer to one another.

Figure 17:
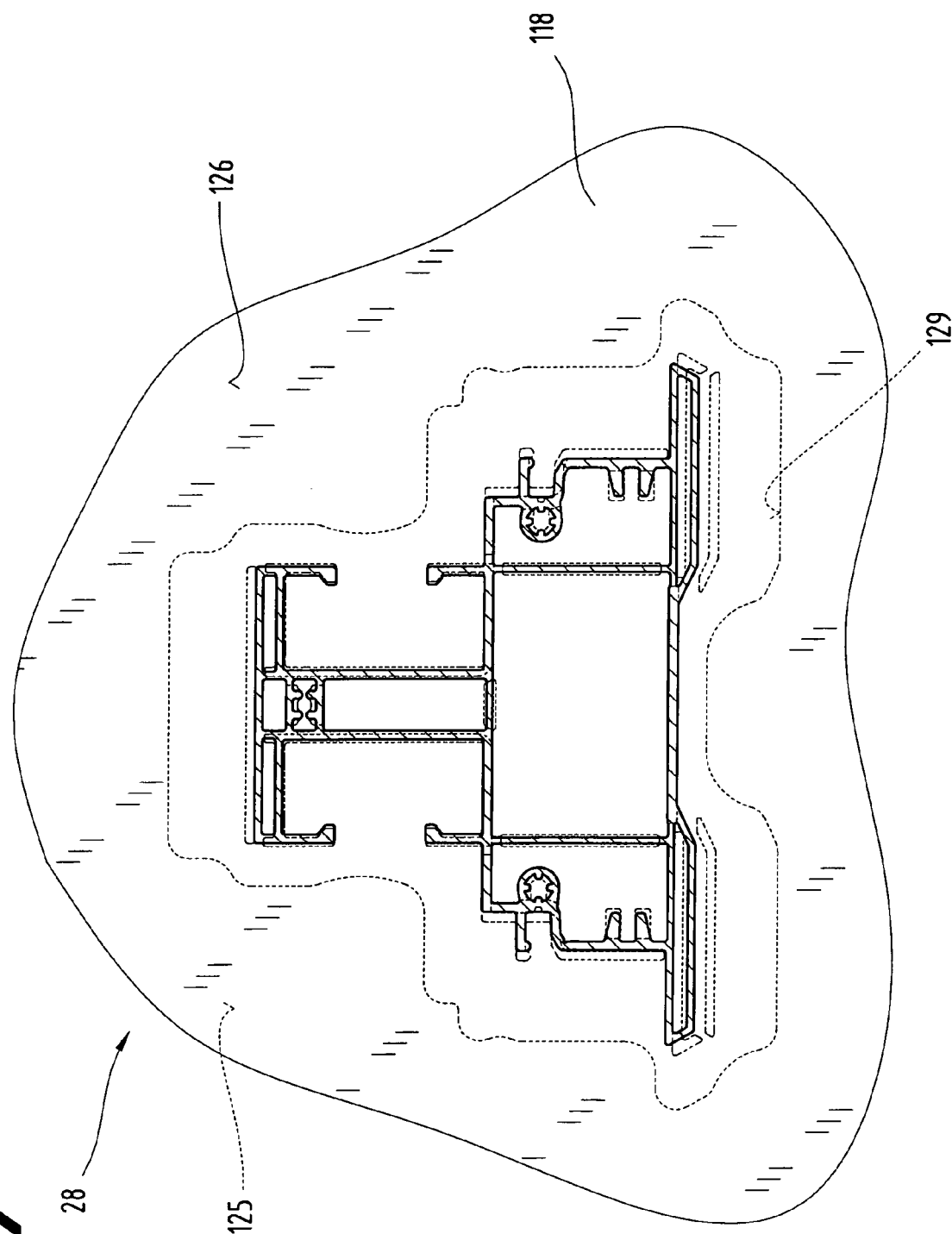
FIG. 17 is a view of the extrusion die illustrated in FIGS. 13 to 16 indicated by arrow XVII in FIG. 13.

Finally, FIG. 17 shows how the individual part-passages 127, 128 merge and open into one another to form a common profiled cross-section for the object 5 to be produced.

As a result of this specially widened and separated passage layout of the individual part-passages 127, 128 adjoining the common passage 34 in the region of the first nozzle plate 115, the initially cohesive melt flow is split into several melt part-flows, pre-shaped in the individual part-passages 127, 128 separated from one another across a pre-definable distance by the extrusion nozzle 28 to form part-portions and fed through it, before being merged to form a common and cohesive profiled cross-section again. Consequently, the individual nozzle plates 115 to 118 and the passage 34 and part-passages 127, 128 disposed in them in the extrusion direction 6, in other words in the direction of the longitudinal axis 35, form passage portions 130 to 133. Due to the fact that the extrusion nozzle 28 is split into several nozzle plates 115 to 118 disposed one after the other, the individual nozzle plates 115 to 118 with the passage 34 and the part-passages 127, 128 disposed in them are relatively easy to process, for example by means of wire and/or sink erosion.

Figure 18:
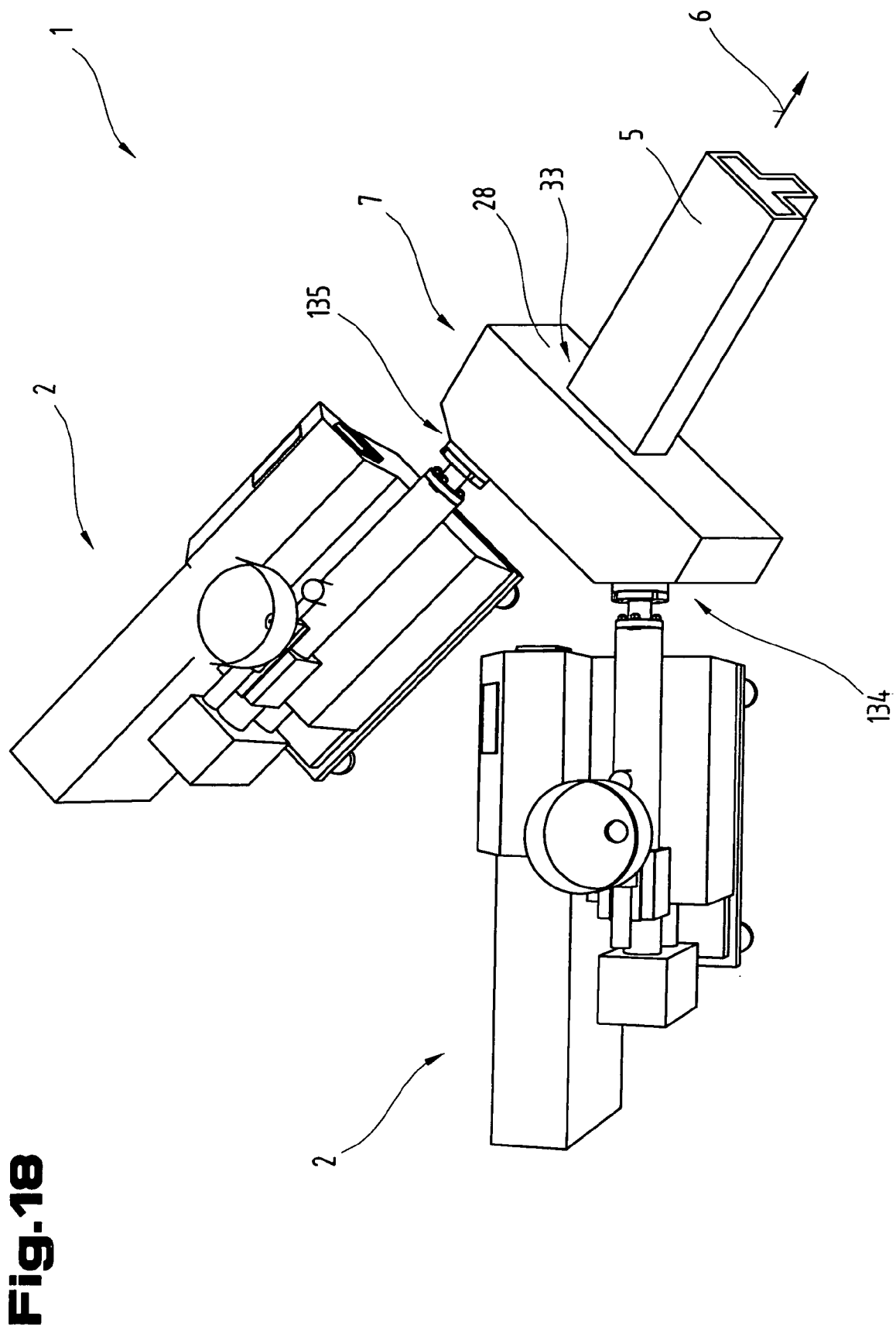
FIG. 18 is a simplified, schematic diagram showing another embodiment of an extrusion die with two extruders opening into it.
Figure 19:
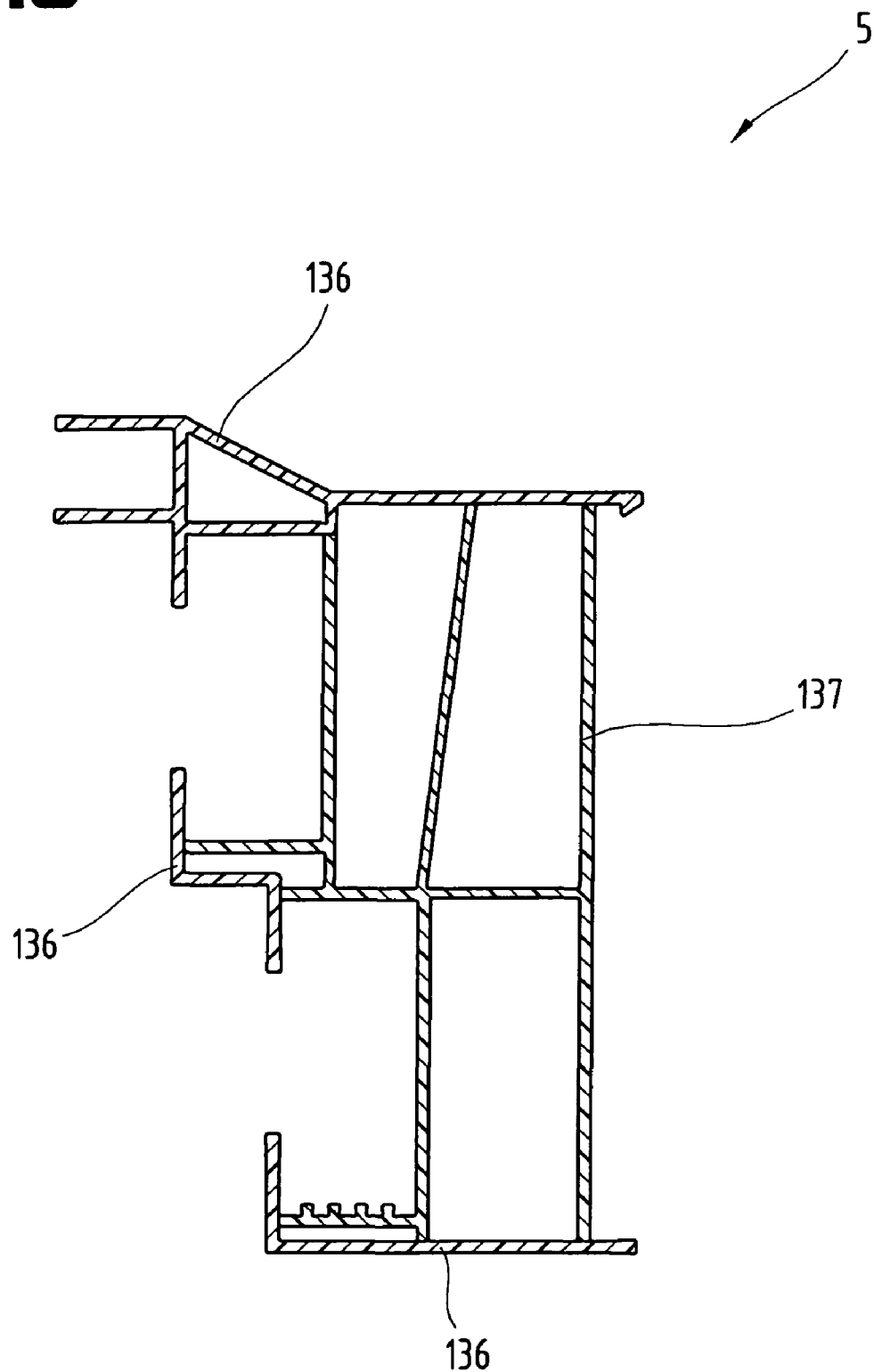
FIG. 19 shows one possible cross-section of an object to be produced by the extrusion die illustrated in FIG. 18.

FIGS. 18 and 19 illustrate another possible embodiment of the extrusion die 7 of the shaping system 3, which may also be construed as an independent solution in its own right, and the same reference numbers and component names are again used for the same parts as those described above in connection with FIGS. 1 to 17. To avoid unnecessary repetition, reference may be made to the more detailed description given in connection with FIGS. 1 to 17 above, in particular the widened passage layout of the part-passages 127, 128 inside the extrusion nozzle 28 illustrated in FIGS. 13 to 17.

As schematically illustrated in FIG. 18, the extrusion die 7, in particular the extrusion nozzle 8, has two mutually separate connections or inlet regions 134, 135, each of which is provided with its own extruder 2. The individual strands of melt leaving the two extruders 2 are directed through the respective inlet region 134, 135 of the extrusion nozzle 28 and through these pre-definable part-passages 127, 128, as described in detail above with reference to FIGS. 13 to 17. As a result, the individual strands of melt can be split and assigned to—in the embodiment illustrated as an example here two—individual profiled parts or portions of the object 5 to be produced, as schematically indicated in FIG. 19 by the different types of hatching, for example. The way the individual strands of melt are split between the part-passages 127, 128, not illustrated, is therefore the same as that described and illustrated in detail above with reference to FIGS. 13 to 17. The only difference resides in the fact that in the case of the extrusion nozzle 28 schematically illustrated in FIG. 18, preferably two spatially separate inlet regions 134, 135 are provided, rather than the single inlet region 32 illustrated in FIG. 13.

Using several individual, mutually separate extruders 2 offers the option of preparing both primary material and regenerated material separately from one another and feeding these separately beforehand to the common extrusion nozzle 28. In FIG. 19, for example, reference number 136 denotes a first plastic material and 137 a different plastic material, and the second plastic material 137 is the plastic material which is used to produce sections and windows so that the resultant material is fed back through the extrusion process and can be recycled. The first plastic material 136 may also be a higher quality material and may be used to make the visible face of the object 5.

As the two different strands of melt pass through the extrusion nozzle 28, they are again separated from one another in the individual part-passages 127, 128 and fed close to the common outlet region 33 and merged before the outlet to form a common, joined strand of melt—in other words the object 5 to be produced—and the strands of melt are joined at the mutually facing surface regions. This represents an easy way of producing objects 5 from initial materials which can be joined to one another but are of differing qualities. This also saves on raw material costs because plastic material that has been extruded once can be recycled.

Figure 20:
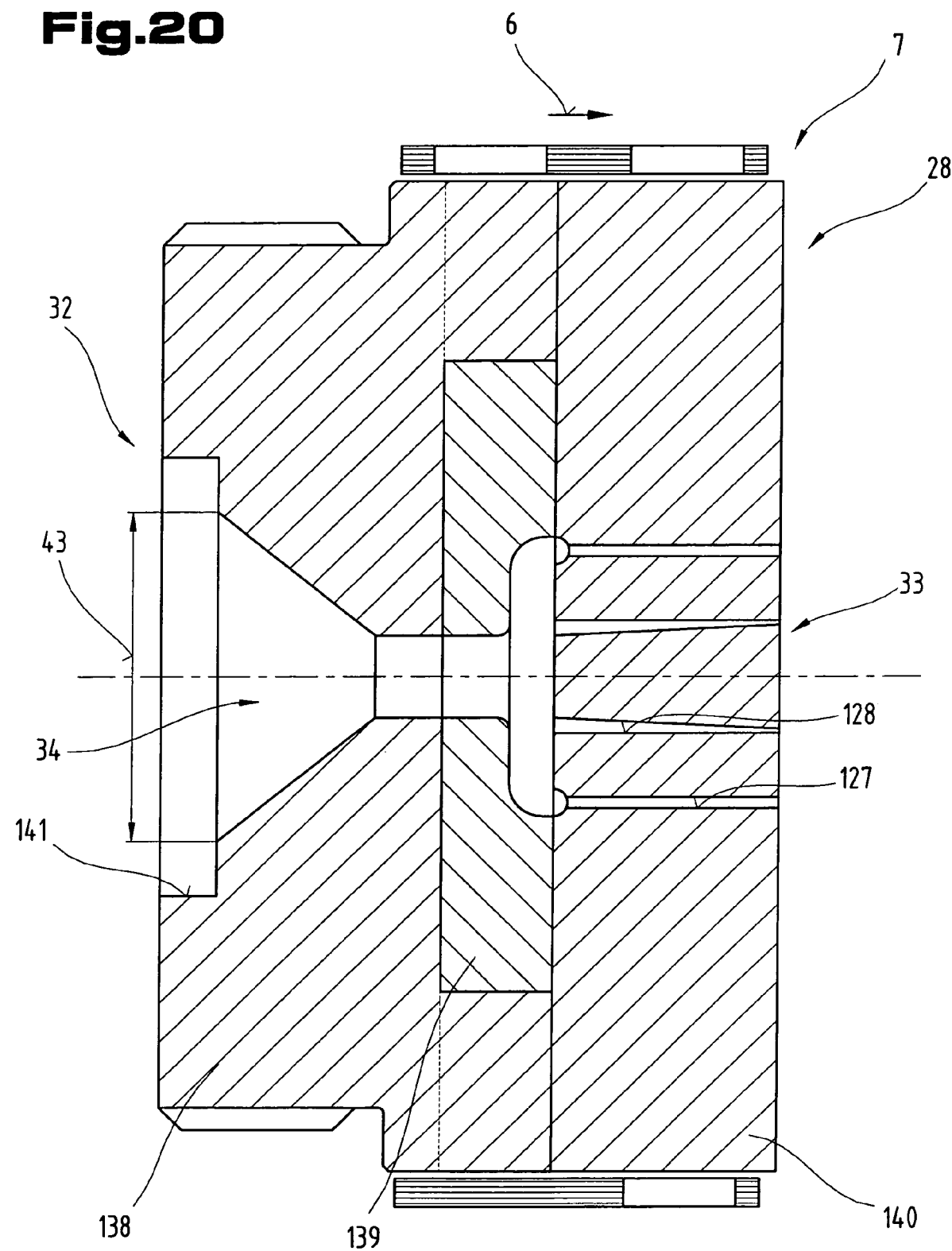
FIG. 20 is a simplified, schematic diagram showing a side view in section of another possible embodiment of an extrusion die.

FIG. 20 illustrates another possible embodiment of the extrusion die 7, in particular the extrusion nozzle 28, which may be construed as an independent solution in its own right, the same component names and reference numbers being used to denote parts that are the same as those described in connection with FIGS. 1 to 19 above. To avoid unnecessary repetition, reference may be made to the more detailed description given above in connection with FIGS. 1 to 19 above.

The extrusion nozzle 28 has the inlet region 32 and the outlet region 33 for the melt to be fed through it in the extrusion direction 6 as well as the strand of melt to be fed through, which is fed by an extruder 2, not illustrated, to the inlet region 32.

The extrusion die 7 in this instance is primarily used to produce profiled patterns to customer's orders on a less complex basis, in which case broader tolerance specifications are used for the profiling accuracy. In principle, the idea is to dispense with a lot of things which unnecessarily drive up production costs.

For the sake of simplicity, the extrusion nozzle 28 comprises several nozzle plates 138 to 140 disposed one after the other, and the first nozzle plate 138 in the extrusion direction 6 has a predefined course with the passage cross-section 43, which is preferably circular, depending on the plastic melt needed to produce the object 5 and the adjoining geometry of the extruders 2. The passage cross-section 43 constitutes the start of the common passage 34, which tapers in a conical arrangement in this example of an embodiment. The portion adjoining the passage 34 and the passage cross-section 43 in the direction opposite the extrusion direction 6 may be provided with a centering shoulder 141, which is used to provide a support on the extruder 2, not illustrated.

What is in this instance the first nozzle plate 138 may have a thickness of 70 mm in the extrusion direction 6 and the passage cross-section 43 a size of 60 mm in diameter, which decreases in terms of its cross-section across the longitudinal extension of the passages 34 to a diameter of 15 mm, for example.

The other nozzle plate 139 is inserted in this first nozzle plate 139 and this nozzle plate 139 acts as a so-called distributor plate. This nozzle plate 139 may have a thickness of 20 mm in the extrusion direction 6, for example, and the two end faces facing the other nozzle plate 140 are flat-faced facing one another. This enables the other nozzle plate 140 to sit in tight contact. It may also be termed an outlet plate. It is in this nozzle plate 140, which is the last nozzle plate in the extrusion direction 6, that the profiled contour is shaped. Again, this takes place in differently arranged part-passages 127, 128, which shape the strand of melt circulating through them to the finished profiled geometry in the outlet region 33. The corresponding split in the melt flows takes place in nozzle plate 139 disposed between the two nozzle plates 138, 140, which splits the melt flow into the individual part-passages 127, 128 starting from the tapered passage 34 depending on the profiled geometry.

The reduced passage cross-section of the passage 34 between the first nozzle plate 138 and the other nozzle plate integrated in it becomes correspondingly wider in the region of what in this instance is the middle nozzle plate 139, depending on the desired profiled geometry, to enable sufficient plastic material to be delivered to the part-passages 127, 128. This takes place depending on the profile insofar as the widened distributor channel already more or less corresponds to the profiled geometry of the object 5 to be produced in terms of its external contour.

However, it would also be possible for what is the middle nozzle plate 139 in this instance to be disposed between the end faces of the first and last nozzle plate 138, 140, as indicated by broken lines.

Due to this simple layout of the individual nozzle plates 138 to 140, the first nozzle plate 138 can be used again and only the two nozzle plates 139 and 140 have to be made again to produce the profile. The extrusion nozzle 28 and the calibrating device 8 with the calibration dies 9 to 13 can thus be operated closed, which means that although a gap is provided between these individual parts of the plant, it is sealed off from the external environment during operation, in other words the ambient pressure, and this cavity surrounding the object 5 as it is fed through is able to reduce the pressure to below atmospheric pressure. This prevents the ingress of ambient air and ambient pressure and thus builds up a pressure difference between the cavity or cavities of the object 5 and its external jacket surface as it pass through and is transferred between the extrusion nozzle 28 and/or the calibration dies 9 to 13 of the calibrating device 8.

The nozzle can be heated or tempered using methods known from the prior art and this will therefore not be described.

Figure 21:
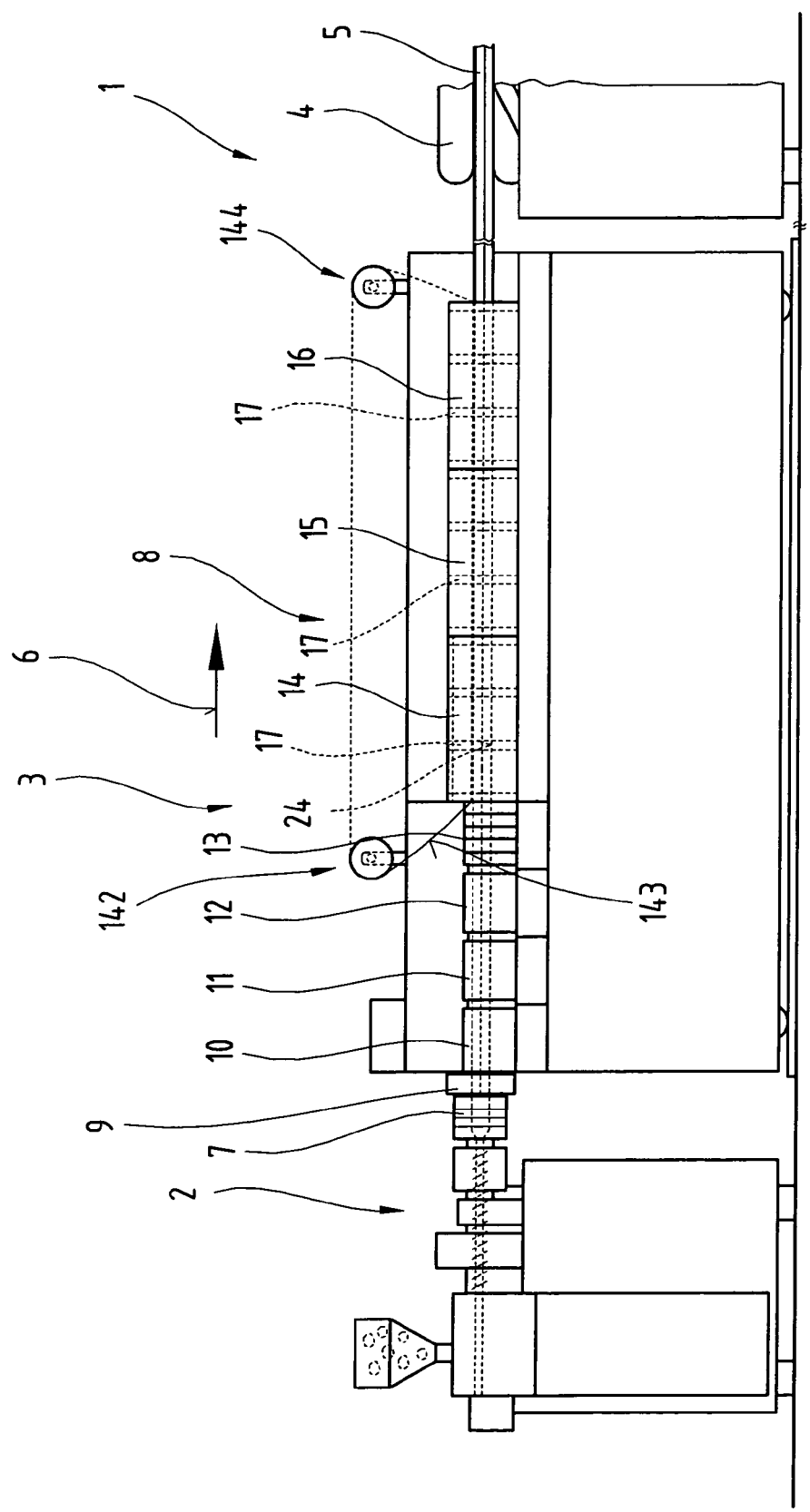
FIG. 21 is a simplified, schematic diagram showing a side view of an extrusion plant with a additional device for applying a strip-shaped element to the object to be produced.
Figure 22:
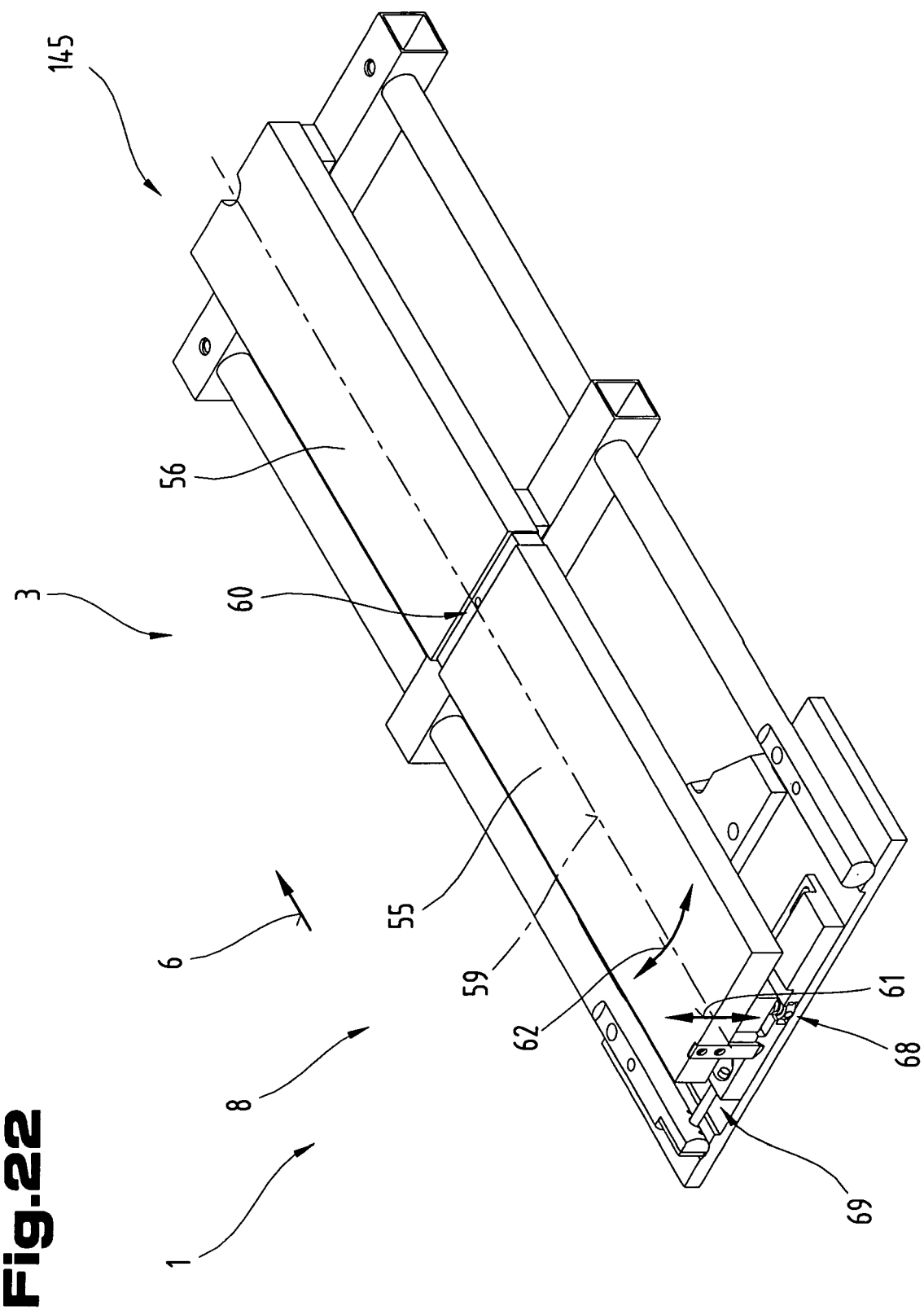
FIG. 22 is a simplified, schematic diagram illustrating another possible embodiment of a support arrangement for calibration dies of the type illustrated in FIGS. 5 to 7.
Figure 23:
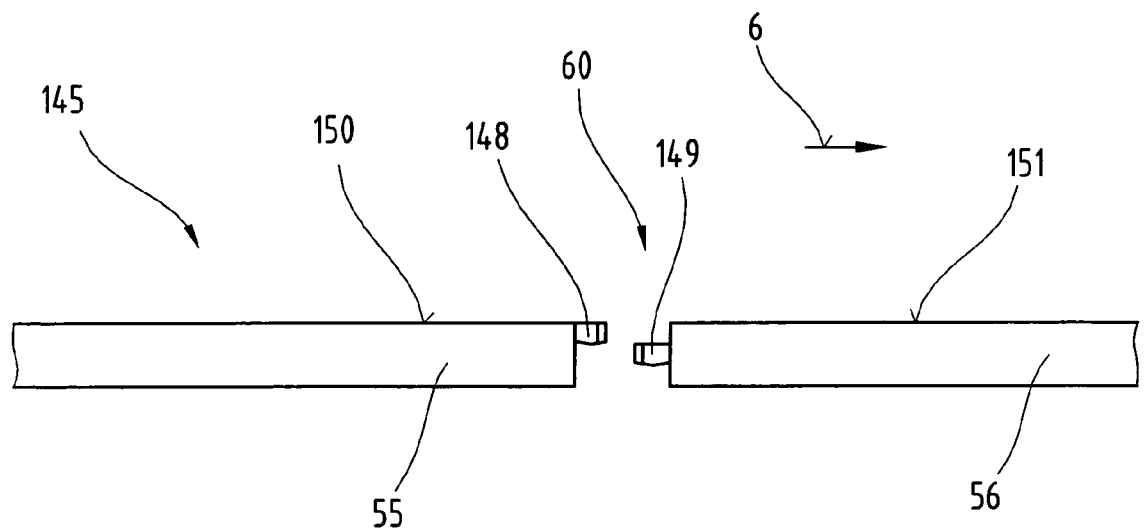
FIG. 23 is a simplified, schematic diagram showing a view of a part region of the support arrangement illustrated in FIG. 22 in a position spaced apart from the joint arrangement.

FIG. 21 illustrates a possible additional facility for the extrusion plant 1, and again, the same reference numbers and component names are used to refer to the same parts as those described in connection with FIGS. 1 to 20 above. To avoid unnecessary repetition, reference may be made to the more detailed description given above in connection with FIG. 1 to 20.

The extrusion plant 1 illustrated in FIG. 21 again comprises the extruder 2, the downstream shaping system 3 and the crawler track 4 by means of which the object 5 can be pulled and fed by the extruder 2 through the shaping system 3 in the extrusion direction 6. Disposed in the region of the extruder 2 is the extrusion die 7 for shaping the object 5. The shaping system 3 also has the calibrating device 8, which may be made up of several calibration dies 9 to 13 as well as several cooling chambers 14 to 16.

Disposed in the intermediate region between the calibration dies 9 to 13 and the cooling chambers 14 to 16 is a schematically illustrated retaining device 142 on which a preferably strip-shaped element 143 is retained so that it can be supplied, for example in the form of a roll of material. This strip-shaped element 143 may be applied to at least certain regions of the external surface of the object 5 to be produced as a protective film, thereby protecting what will subsequently be the visible face of the object 5 from surface damage as it passes through the cooling chambers 14 to 16 and if necessary by the crawler track 4. Due to the constant pulling movement of the object 5 in the extrusion direction 6, the supporting and calibration plates disposed in the cooling chambers 14 to 16 can cause scoring and scratching in the as yet not fully cooled surface of the object and thus reduce the quality.

In existing plants, the element 143 is applied as a so-called protective film to at least certain regions of an external surface of the object 5 after the crawler track 4 and the extruded endless strand of the object 5 is then cut into bar material by a cutting device, although this is not illustrated. By applying the strip-shaped element 143 immediately adjoining the end of the calibrating shaping process in the region of the calibration dies 9 to 13 instead—in this instance at the end of the last calibration dies 13—and before entering the first cooling chamber 14, better protection is afforded to the surface of the object 5 in this region. This is of advantage because it is a known fact that the object 5 will be flushed with a liquid cooling medium inside the cooling chambers 14 to 16, although this is not illustrated, and there is therefore a possibility that impurities may be carried by the cooling medium between the external surface of the object 5 and the calibration orifices 24 in the support and calibration plates 17, which can lead to additional damage to the surface of the object 5.

In the embodiment illustrated as an example here, the strip-shaped element 143 is a roll of material, for example, and it detachably adheres to the object 5. This means that when the object 5 is being used to make windows or doors, the area that needs to be protected, in particular the visible face, is also itself protected from damage and the protection need not be removed until assembly is complete.

Irrespective of the above, it would also be possible to remove the applied strip-shaped element 143 from the surface of the object 5 across part-runs between applying it to the surface and the cutting device, feed the element 143 separately from the object 5 in this region and then apply it to the surface again. Another option would be to pull the strip-shaped element 143 off the surface to be protected before the cutting device and re-apply it. This could be done by pulling the strip-shaped element 143 off either before cutting the object 5 and wrapping it accordingly or feed it in the form of an endless web back to the region of the retaining device 142, in which case the retaining device 142 will be provided in the form of a pulley or return-feed device.

FIG. 21 also provides a simplified illustration of the end of the last cooling chamber 16, where the strip-shaped element 143 is provided in the form of an endless strip and is used to protect the object 5 only when it is passing through the cooling chambers 14 to 16. In this instance, a simplified pulley device 144 is provided in the end region of the last cooling chamber 16 for the strip-shaped element 143 indicated by broken lines, by means of which the latter can be lifted once the object 5 has left the last cooling chamber 16 and fed back into the region of the retaining device 142 without any contact, in other words separately from the object 5, in which case the retaining device 142 is also provided in the form of a pulley device 144. In order to retain clarity, clamping mechanisms and intermediate storages for the element 143 have been omitted from the drawings.

FIG. 23 to 26 illustrate one possible embodiment of the joint arrangement 60, mentioned earlier in connection with FIGS. 5 to 7 for example. The same reference numbers and component names are used for the same parts as those described in FIGS. 1 to 22 above. To avoid unnecessary repetition, reference may be made to the more detailed description given above in connection with FIGS. 1 to 22.

The support plate 55 and the mounting plate 56 for the calibration dies 10 to 12 disposed one after the other in the extrusion direction to form a support arrangement 145. The joint arrangement 60 illustrated in this example of an embodiment comprises mutually facing end faces 146, 147 of the support plate 55 and the mounting plate 56, a supporting batten 148 extending out from the end face 146 and 147 respectively and a support batten 149. Die support plate 55 and the die mounting plate 56 in turn each have respective facing bearing surfaces 150, 151 on which the calibration dies 10 to 12 are supported. The support plate 55 and the mounting plate 56 also preferably each have an identical thickness 152, 153 auf.

The supporting batten 148 disposed on the support plate 55 at the end face 46 extends across a part-region of the thickness 152 of the support plate 55 and is therefore of a slimmer thickness 154 in the same direction. The supporting batten 148 is preferably flat on the side facing the bearing surface 150 towards the bearing surface 150 accommodating the calibration dies 10 to 12 and facing them. On the side remote from the bearing surface 150, the supporting batten 148 has inclined boundary surfaces 155, 156 extending transversely to the longitudinal extension of the support plate 55 and transversely to the extrusion direction 6 as well as parallel with the bearing surface 150 converging in a V-shape in the direction facing away from the bearing surface 150. In order to prevent a linear bearing of the boundary surfaces 155, 156 converging in a V-shape, a first support surface 157 may be provided in the region of the V-shaped converging boundary surfaces 155, 156, between them, oriented parallel with the bearing surface 150, which is kept very small in its extension in the extrusion direction. Another option would be to provide a transition radius, which would permit a simple movement during the relative pivoting movement with a gentle contact on the complementary surface.

Figure 24:
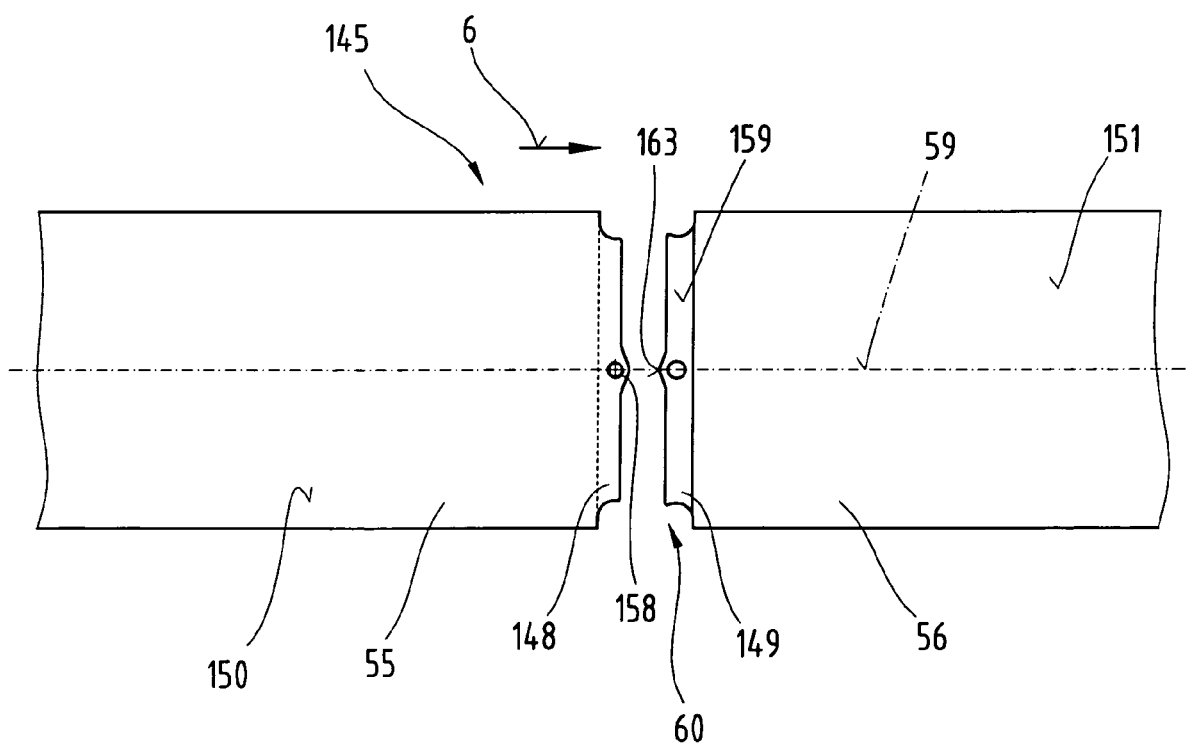
FIG. 24 is a schematic diagram on a larger scale showing a plan view of a part region of the support arrangement illustrated in FIGS. 22 and 23 in a position spaced apart from the joint arrangement.

As may also be seen from a comparison of FIGS. 24 and 25, an internal thread 158 is provided in the supporting batten 148 at an intersection point between the longitudinal axis 59 of the support plate 55 and the converging V-shaped boundary surfaces 155, 156 oriented in a vertical direction by reference to the bearing surface 150, which preferably extends completely through the supporting batten 148. However, it would also be possible for the internal thread 158 to be closed in the region of the top face directed towards the bearing surface 150.

The support batten 149 facing the support plate 55 and disposed on the end face 147 of the mounting plate 56 has another flat support surface 159 on the side facing the bearing surface 151. This other support surface 159 on the support batten 149 is intended to provide a support for the first support surface 157 on the supporting batten 148. It should be pointed out that the support surface 157 provided on the supporting batten 148 has only a slim width as viewed in the longitudinal extension of the support plate 55 and is formed by a transition radius to avoid any cutting contact and thus prevent potential notching on the support surface 159 of the support batten 149 facing it.

The other support surface 159 on the support batten 149 is disposed offset from the bearing surface 151 in the direction perpendicular to it. The degree of offset of the other support surface 159 of the support batten 149 from the bearing surface 151 corresponds to the thickness 154 of the supporting batten 148 in the vertical direction by reference to the two bearing surfaces 150, 151. This ensures that when the support surfaces 157, 159 are co-operating, the two bearing surfaces 150, 151 can be oriented flat when they are oriented parallel with one another. Consequently, the calibration dies 10 to 12 disposed on them can be disposed on the support plate 55 and on the mounting plate 56 without any height offset.

On the side remote from the bearing surface 151, the support batten 149 may have other inclined boundary surfaces 160, 161 extending transversely to the longitudinal extension of the mounting plate 56 and parallel with the bearing surface 151 converging in a V-shape in the direction facing away from the bearing surface 151. Starting from the support surface 159, the support batten 149 has a thickness 162 in the direction perpendicular to the bearing surface 151 as far as the intersecting line of the two boundary surfaces 160, 161. A total of the thickness 154 of the supporting batten 148 plus the thickness 162 of the support batten 149 is less than the thickness 152 and 153 of the support plate 55 and mounting plate 56.

In order to provide mutual support for the support plate 55 on the mounting plate 56 in the extrusion direction 6, this support is provided between the end face 146 of the support plate 55 and an end face 163 on the support batten 149 facing it.

In order to permit a pivoting movement of the support plate 55 in the horizontally illustrated position relative to the mounting plate 56, the end face 163 of the support batten 149 facing the support plate 55 converges in a V-shape in the direction towards the support plate 55 as viewed in the vertical direction towards the bearing surface 151, at least in the region of the longitudinal axis 59. A transition radius may be provided in the region of the mutually intersecting end faces 163 in order to prevent damage to the co-operating end face 146 on the support plate 55.

As may also be seen from a comparison of FIGS. 24 and 25, an orifice 164, in particular a bore, oriented in a direction perpendicular to the bearing surface 151, is provided in the support batten 149 at an intersection point between the longitudinal axis 59 of the mounting plate 56 and the other boundary surfaces 160, 161 converging in a V-shape.

FIG. 26 illustrates the assembled position of the joint arrangement 60 between the support plate 55 and the mounting plate 56. The orifice 164 has a connecting element 165 extending through it, in particular a screw or similar, and it mates with the internal thread 158 in the supporting batten 148.

In the assembled state, the first support surface 157 of the supporting batten 148 is supported on the other support surface 159 of the support batten 149. Due to the boundary surfaces 155, 156 on the supporting batten 148 converging in a V-shape, the support plate 55 can be displaced vertically on the side facing away from the joint arrangement 60 by means of the displacement device 68 described above. In this respect, the displacement which is possible depends on the angles of inclination of the boundary surfaces 155, 156 with respect to the support surface 159. In the same way, when the support plate 55 is displaced accordingly, the connecting element 165 connected to it is also pivoted as well. The free space needed for the pivoting movement is provided by the other boundary surfaces 160, 161 on the support batten 149, which are also inclined at an angle to one another. The pivoting path needed for the connecting element 165 is also provided by the free space inside the support batten 149 created by the orifice 164.

To permit the pivoting movement in the horizontal direction of the support plate 55 relative to the mounting plate 56, a width 166 of the support batten 149 in the region of the longitudinal axis 59 and in the direction thereof is bigger than a width 167 of the supporting batten 148 in the same region and the same direction. This results in an effective mutual support for the support plate 55 disposed upstream of the mounting plate 56 in the extrusion direction 6 on the mutually facing end faces 146 of the support plate 55 and the end face 163 on the support batten 149.

Figure 27:
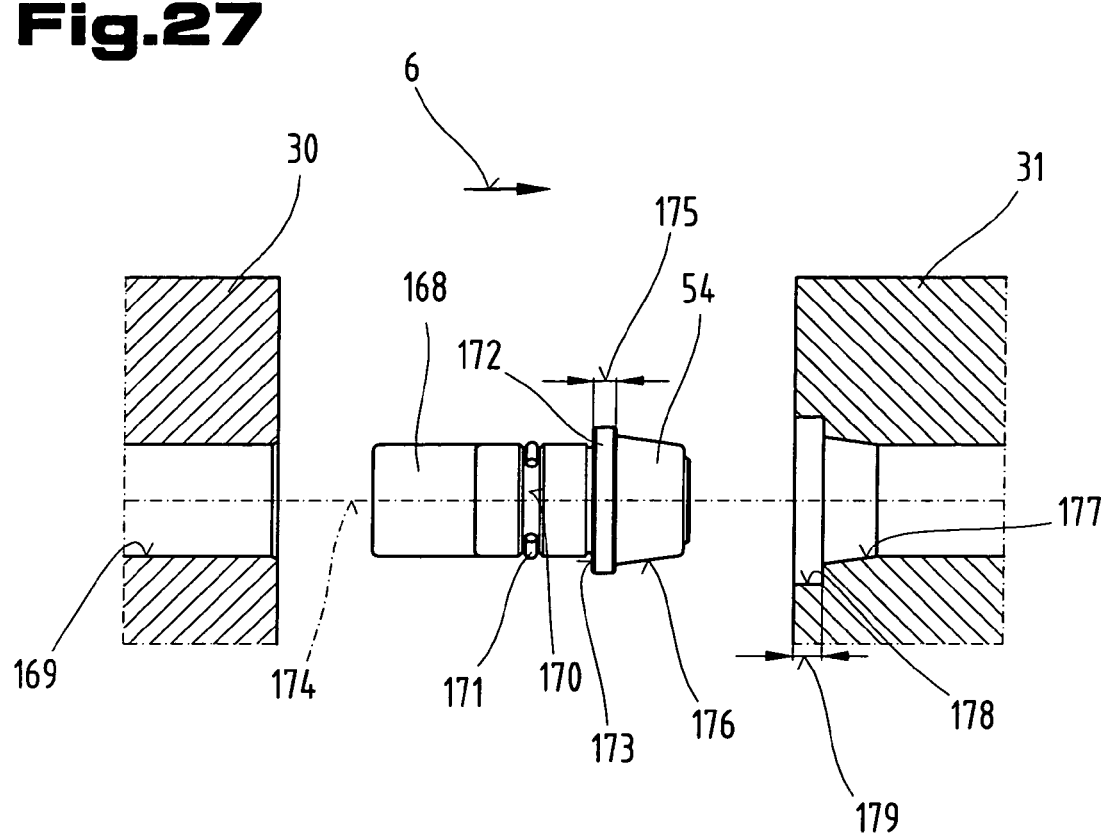
FIG. 27 is a view in section showing one possible embodiment of a fitting and centering element between directly adjacent components of an extrusion die in a position in which the individual components are separated from one another.
Figure 28:
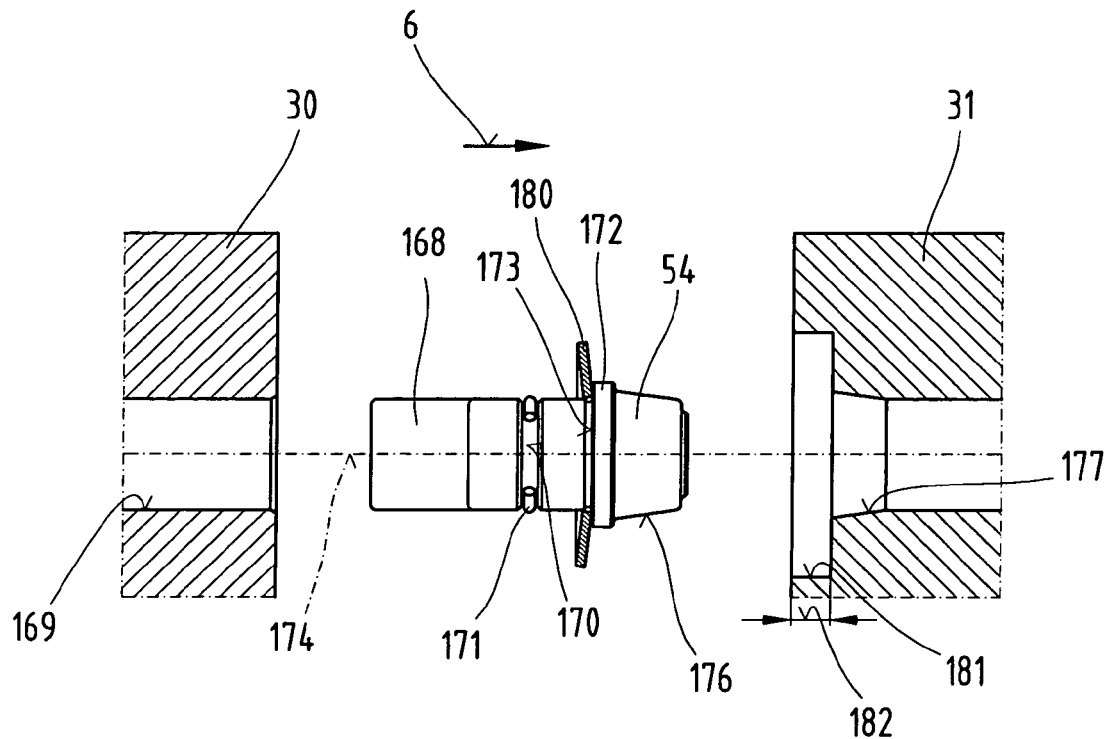
FIG. 28 is a view in section showing another possible embodiment of a fitting and centering element between directly adjacent components of an extrusion die in a position in which the individual components are separated from one another.

FIGS. 27 and 28 illustrate other possible embodiments for the fitting element 54, which may also be construed as independent solutions in their own right, described above in connection with the top right-hand part of FIG. 2 showing the extrusion die 7 in the form of an extrusion nozzle 28. The same reference numbers and component names are used to denote the same parts as those described in connection with FIGS. 1 to 26 above. To avoid unnecessary repetition, reference may be made to the more detailed description given in connection with FIGS. 1 to 26 above.

The purpose of the fitting element 54 illustrated in FIG. 27 is to obtain a mutual, exactly centered position of the elements 30, 31 when still in a position separated from one another, as is the case with the nozzle plates for example. On the side facing the element 30, the fitting element 54 has a shoulder 168, which is preferably cylindrical. This shoulder 168 is inserted in a receiving orifice 169 with a corresponding mutual fitting option. In order to fix the position of the shoulder 168 in the receiving orifice 169, a groove-shaped 168 recess 170 is provided in the shoulder, which extends around the circumference and in which a clamping ring 171 is also inserted. In its non-clamped state, the latter has a bigger external dimension or a bigger external diameter than the shoulder 168 and its circumferential dimension is elastically deformed when the shoulder 168 is inserted in the receiving orifice 169. It lies against the internal surface of the receiving orifice 169. As a result, the fitting element 54, which may also be termed a centering element, is retained in the receiving orifice 169 when the shoulder is in the inserted position, preventing the fitting element 54 from falling out of the receiving orifice 169.

Adjoining the shoulder 168 in the direction towards the other element 31, the fitting element 54 has a circumferentially extending collar 172 projecting out from the shoulder 168. In the inserted state, a collar surface 173 facing the element 30 173 lies on the end face of the element 30 facing it. The collar 172 has a thickness 175 in the direction of its longitudinal mid-axis 174. Adjoining the collar 172, the fitting element 54 has a frustoconical surface 176, which tapers in the direction facing away from the shoulder 168. The biggest diameter of the frustoconical surface 176 is smaller than the external dimension of the collar 172.

In the other element 31, which has to be centered relative to the element 30 disposed upstream of it in the extrusion direction 6, it has a centering surface 177 complementing the frustoconical surface 176. In order to accommodate the collar 172, the element 31 also has a recess 178, which has a depth 179 as viewed in the direction of the longitudinal mid-axis 74, which is the same as, preferably bigger than, the thickness 175 of the collar 172. The external dimension or diameter of the recess 178 for inserting the collar 172 is preferably selected so that it is bigger than the latter.

Due to the depth 179 of the recesses 178, which is preferably bigger than the thickness 175 of the collar 172, the end face or end face of the element 31 facing the fitting element 54 can be subsequently ground if a perfect seal is not obtained between the mutually abutting elements 30, 31 without affecting the centering action of the fitting element 54.

FIG. 28 illustrates an embodiment of the fitting element 54 similar to that shown in FIG. 27, and only those aspects which differ from the embodiment described and illustrated in FIG. 27 will be explained. In this instance, the fitting element 54 is provided with a spring element 180 on the side of the collar 172 facing the collar surface 173, such as a plate spring for example. In the fitted state, the spring element 180 is supported by its external, bigger diameter or its bigger dimension on the end face of the element 30 disposed upstream in the extrusion direction 6. The collar 172 is supported by its collar surface 173 in the region of the smaller dimension of the spring element 180. Disposed in the other element 31 disposed downstream in the extrusion direction 6 is a preferably circular recess 181, the depth 182 of which is selected so that when the elements 30, 3 are lying against the end faces 30, 31, the frustoconical surface 176 of the fitting element 54 is always automatically pressed against the centering surface 177 due to the pre-tensioning of the spring element 180.

If the dimensions and the pre-tensioning of the spring element 180 are selected accordingly, the mutually facing end faces of the element 30 and/or 31 can be subsequently ground but the co-operating frustoconical surface 176 of the fitting element 54 still remains engaged with the centering surface 177 in the element 31 in the assembled state.

The embodiments illustrated as examples represent possible variants of the extrusion plant 1 with a range of different plant parts, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the extrusion plant 1, it and its constituent parts are illustrated to a certain extent out of scale and/or on an enlarged scale and/or on a reduced scale.

Above all, the individual embodiments of the subject matter illustrated in FIGS. 1; 2, 3, 4; 5, 6, 7; 8, 9; 10, 11, 12; 13, 14, 15, 16, 17; 18, 19; 20; 21; 22, 23, 24, 25, 26; 27; 28 constitute independent solutions proposed by the invention in their own right. The objectives and associated solutions proposed by the invention may be found in the detailed descriptions of these drawings.

| List of reference numbers | |
|---|---|
| 1 | Extrusion plant |
| 2 | Extruder |
| 3 | Shaping system |
| 4 | Crawler track |
| 5 | Object |
| 6 | Extrusion direction |
| 7 | Extrusion die |
| 8 | Calibrating device |
| 9 | Calibration die |
| 10 | Calibration die |
| 11 | Calibration die |
| 12 | Calibration die |
| 13 | Calibration die |
| 14 | Cooling chamber |
| 15 | Cooling chamber |
| 16 | Cooling chamber |
| 17 | Calibration plate |
| 18 | Container |
| 19 | Machine bed |
| 20 | Standing surface |
| 21 | Calibrating table |
| 22 | Roller |
| 23 | Track |

-continued

List of reference numbers

| | | |
|---|---|---|
| 24 | Calibration orifice | |
| 25 | Shaping surface | |
| 26 | Shaping surface | |
| 27 | Calibration plate | |
| 28 | Extrusion nozzle | |
| 29 | Element | |
| 30 | Element | |
| 31 | Element | |
| 32 | Inlet region | |
| 33 | Outlet region | |
| 34 | Passage | |
| 35 | Longitudinal axis | |
| 36 | Total length | |
| 37 | Longitudinal portion | |
| 38 | Distance | |
| 39 | Passage portion | |
| 40 | Passage portion | |
| 41 | Passage portion | |
| 42 | Passage portion | |
| 43 | Passage cross-section | |
| 44 | Passage cross-section | |
| 45 | Passage wall | |
| 46 | Passage wall | |
| 47 | Passage | |
| 48 | Passage cross-section | |
| 49 | Passage center | |
| 50 | Mandrel | |
| 51 | Mandrel part | |
| 52 | Mandrel fitting | |
| 53 | Mandrel fitting part | |
| 54 | Fitting element | |
| 55 | Support plate | |
| 56 | Mounting plate | |
| 57 | Support element | |
| 58 | Double arrow | |
| 59 | Longitudinal axis | |
| 60 | Joint arrangement | |
| 61 | Double arrow | |
| 62 | Double arrow | |
| 63 | Calibration axis | |
| 64 | Calibration axis | |
| 65 | Calibration orifice | |
| 66 | Part-portion | |
| 67 | Part-portion | |
| 68 | Displacement device | |
| 69 | Displacement device | |
| 70 | End face | |
| 71 | Jacket | |
| 72 | Profiled chamber | |
| 73 | Web | |
| 74 | Surface | |
| 75 | Treatment device | |
| 76 | Housing | |
| 77 | Flow passage | |
| 78 | Tempering element | |
| 79 | Deflector passage | |
| 80 | Passage side wall | |
| 81 | Baffle element | |
| 82 | Shoulder | |
| 83 | Shaping surface | |
| 84 | Shaping surface | |
| 85 | Shaping surface | |
| 86 | Shaping surface | |
| 87 | End face | |
| 88 | End face | |
| 89 | Side face | |
| 90 | Side face | |
| 91 | Side face | |
| 92 | Side face | |
| 93 | Inlet region | |
| 94 | Inlet region | |
| 95 | Cavity | |
| 96 | Passage | |
| 97 | Passage | |
| 98 | Cover plate | |
| 99 | Base plate | |
| 100 | Outlet line | |

-continued

List of reference numbers

| | | |
|---|---|---|
| 101 | Width | |
| 102 | Width | |
| 103 | Width | |
| 104 | Distance | |
| 105 | Part-end face | |
| 106 | Distance | |
| 107 | Part-end face | |
| 108 | Part-end face | |
| 109 | Radius | |
| 110 | Component | |
| 111 | Inlet port | |
| 112 | Shoulder | |
| 113 | Dimension | |
| 114 | Sealing surface | |
| 115 | Nozzle plate | |
| 116 | Nozzle plate | |
| 117 | Nozzle plate | |
| 118 | Nozzle plate | |
| 119 | End face | |
| 120 | End face | |
| 121 | End face | |
| 122 | End face | |
| 123 | End face | |
| 124 | End face | |
| 125 | End face | |
| 126 | End face | |
| 127 | Part-passage | |
| 128 | Part-passage | |
| 129 | Passage cross-section | |
| 130 | Passage portion | |
| 131 | Passage portion | |
| 132 | Passage portion | |
| 133 | Passage portion | |
| 134 | Inlet region | |
| 135 | Inlet region | |
| 136 | Plastic material | |
| 137 | Plastic material | |
| 138 | Nozzle plate | |
| 139 | Nozzle plate | |
| 140 | Nozzle plate | |
| 141 | Centering shoulder | |
| 142 | Retaining device | |
| 143 | Element | |
| 144 | Pulley device | |
| 145 | Support arrangement | |
| 146 | End face | |
| 147 | End face | |
| 148 | Supporting batten | |
| 149 | Support batten | |
| 150 | Bearing surface | |
| 151 | Bearing surface | |
| 152 | Thickness | |
| 153 | Thickness | |
| 154 | Thickness | |
| 155 | Boundary surface | |
| 156 | Boundary surface | |
| 157 | Support surface | |
| 158 | Internal thread | |
| 159 | Support surface | |
| 160 | Boundary surface | |
| 161 | Boundary surface | |
| 162 | Thickness | |
| 163 | End face | |
| 164 | Orifice | |
| 165 | Connecting element | |
| 166 | Width | |
| 167 | Width | |
| 168 | Shoulder | |
| 169 | Receiving orifice | |
| 170 | Recess | |
| 171 | Clamping ring | |
| 172 | Collar | |
| 173 | Collar surface | |
| 174 | Longitudinal mid-axis | |
| 175 | Thickness | |
| 176 | Frustoconical surface | |
| 177 | Centering surface | |

-continued

| List of reference numbers | |
|---|---|
| 178 | Recess |
| 179 | Depth |
| 180 | Spring element |
| 181 | Recess |
| 182 | Depth |

The invention claimed is:

1. Support arrangement (145) for retaining several calibration dies (10 to 12) of a calibrating device (8) disposed one after the other in the extrusion direction (6) on a calibrating table (21) of an extrusion plant (1), which calibration dies (10 to 12) disposed one after the other have calibration orifices (65) with calibration axes (63, 64) extending through them, wherein the support arrangement (145) comprises a support plate (55) and a mounting plate (56) separate from the support plate and the support plate (55) is disposed immediately upstream of the mounting plate (56) as viewed in the extrusion direction (6), and a joint arrangement (60) is provided between the support plate (55) and the mounting plate (56) by means of which the support plate (55) can be spatially displaced about the joint arrangement (60) relative to the mounting plate (56), as a result of which the calibration axes (63, 64) of calibration dies (10 to 12) disposed one after the other in the extrusion direction (6) can be pivoted at an angle to one another, wherein the support plate (55) is respectively provided with at least one displacement device (68, 69) on the side remote from the joint arrangement (60) for effecting a horizontal and vertical displacement.

2. Support arrangement (145) according to claim 1, wherein the support plate (55) is supported on the mounting plate (56) via the joint arrangement (60).

3. Support arrangement (145) according to claim 1, wherein the mounting plate (56) is provided with spacing and support elements (57) by means of which the mounting plate (56) can be supported on the calibrating table (21).

4. Support arrangement (145) for retaining several calibration dies (10 to 12) of a calibrating device (8) disposed one after the other in the extrusion direction (6) on a calibrating table (21) of an extrusion plant (1), which calibration dies (10 to 12) disposed one after the other have calibration orifices (65) with calibration axes (63, 64) extending through them, wherein the support arrangement (145) comprises a support plate (55) and a mounting plate (56) separate from the support plate and the support plate (55) is disposed immediately upstream of the mounting plate (56) as viewed in the extrusion direction (6), and a joint arrangement (60) is provided between the support plate (55) and the mounting plate (56) by means of which the support plate (55) can be spatially displaced about the joint arrangement (60) relative to the mounting plate (56), as a result of which the calibration axes (63, 64) of calibration dies (10 to 12) disposed one after the other in the extrusion direction (6) can be pivoted at an angle to one another, wherein the joint arrangement (60) has a supporting batten (148) and a support batten (149) respectively projecting out from the end face (146, 147) on mutually facing end faces (146, 147) of the support plate (55) and the mounting plate (56).

5. Support arrangement (145) according to claim 4, wherein the supporting batten (148) extends across a part-region of a thickness (152) of the support plate (55).

6. Support arrangement (145) according to claim 4, wherein the supporting batten (148) is directed towards a bearing surface (150) which can be turned flat to face the calibration die (10 to 12).

7. Support arrangement (145) according to claim 4, wherein the supporting batten (148) has boundary surfaces (155, 156) extending at an angle on the side remote from the bearing surface (150) as viewed transversely to the longitudinal extension of the support plate (55) and parallel with the bearing surface (150) converging in a V-shape in the direction remote from the bearing surface (150).

8. Support arrangement (145) according to claim 7, wherein a first support surface (157) is disposed in the region of the boundary surfaces (155, 156) converging in a V-shape, between them and parallel with the bearing surface (150).

9. Support arrangement (145) according to claim 4, wherein an internal thread (158) oriented in a direction perpendicular to the bearing surface (150) is provided in the supporting batten (148) at an intersection point between a longitudinal axis (59) of the support plate (55) and the boundary surfaces (155, 156) converging in a V-shape.

10. Support arrangement (145) according to claim 4, wherein the support batten (149) has a flat, other support surface (159) on the side facing the bearing surface (151).

11. Support arrangement (145) according to claim 10, wherein the other support surface (159) of the support batten (149) is disposed offset from the bearing surface (151) in the direction perpendicular thereto.

12. Support arrangement (145) according to claim 11, wherein the offset of the other support surface (159) of the support batten (149) from the bearing surface (151) corresponds to a thickness (154) of the supporting batten (148) in the direction perpendicular to the bearing surface (150, 151).

13. Support arrangement (145) according to claim 4, wherein the support batten (149) has other boundary surfaces (160, 161) inclined at an angle converging in a V-shape in the direction remote from the bearing surface (151) on the side remote from the bearing surface (151) as viewed transversely to the longitudinal extension of the mounting plate (56) and parallel with the bearing surface (151).

14. Support arrangement (145) according to claim 4, wherein the thickness (154, 162) of the supporting batten (148) and that of the support batten (149) are in total less than the thickness (152, 153) of the support and the mounting plate (55, 56).

15. Support arrangement (145) according to claim 4, wherein the end face (146) of the support plate (55) is supported on an end face (163) of the support batten (149) facing it.

16. Support arrangement (145) according to claim 15, wherein the end face (163) of the support batten (149) facing the support plate (55) converges in a V-shape at least in the region of the longitudinal axis (59) in the direction towards the support plate (55) as viewed in the direction perpendicular to the bearing surface (151).

17. Support arrangement (145) according to claim 4, wherein an orifice (164) oriented in the direction perpendicular to the bearing surface (151), in particular a bore, is disposed in the support batten (149) at an intersection point between the longitudinal axis (59) of the mounting plate (56) and the other boundary surfaces (160, 161) converging in a V-shape.

18. Support arrangement (145) according to claim 4, wherein the orifice (164) has a connecting element (165) extending through it, in particular a screw, which mates in the internal thread (158) of the supporting batten (148).

19. Support arrangement (145) according to claim 4, wherein a width (166) of the support batten (149) in the region of the longitudinal axis (59) and in the direction thereof is bigger than a width (167) of the supporting batten (148) in the same region and in the same direction.

20. Method of producing an extruded object (5) comprising a first part-portion (66) with a cavity and another part-portion (67) comprising a solid section, whereby the object (5) is fed through several calibration dies (10 to 12) of a calibration device (8) disposed one after the other in the extrusion direction (6) and retained on a calibration table (21) of an extrusion plant (1) on a support arrangement (145), and the calibration dies (10 to 12) disposed one after the other have calibration orifices (65) with calibration axes (63, 64) extending through them, wherein the support arrangement (145) comprises a support plate (55) and a mounting plate (56) separate from the support plate and the support plate (55) is disposed immediately upstream of the mounting plate (56), and the calibration axes (63, 64) of calibration dies (10 to 12) disposed one after the other in the extrusion direction (6) can be pivoted relative at an angle to one another about a joint arrangement (60) disposed between the support plate (55) and the mounting plate (56), wherein the support plate can be spatially displaced about the joint arrangement relative to the mounting plate via the joint arrangement, wherein the support plate is respectively provided with at least one displacement device on the side remote from the joint arrangement for effecting a horizontal and vertical displacement, and the first part-portion (66) with the cavity can be stretched relative to the other part-portion (67) with the solid section in the transfer region between the support plate (55) and the mounting plate (56).

* * * * *

UNITED STATES PATENT AND TRADEMARK OFFICE
CERTIFICATE OF CORRECTION

PATENT NO. : 7,878,792 B2
APPLICATION NO. : 11/886189
DATED : February 1, 2011
INVENTOR(S) : Kössl It is certified that error appears in the above-identified patent and that said Letters Patent is hereby corrected as shown below:

Column 36, line 4 (line 15 of Claim 20), after the word "pivoted", please delete the word: "relative".

Signed and Sealed this
Fifth Day of April, 2011

David J. Kappos
*Director of the United States Patent and Trademark Office*